United States Patent
Katayama et al.

(10) Patent No.: US 8,776,516 B2
(45) Date of Patent: Jul. 15, 2014

(54) EXHAUST HEAT RECOVERY SYSTEM

(75) Inventors: Masaaki Katayama, Susono (JP); Daisaku Sawada, Gotenba (JP); Hiroshi Yaguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 12/812,124

(22) PCT Filed: May 22, 2009

(86) PCT No.: PCT/JP2009/059451
§ 371 (c)(1),
(2), (4) Date: Jul. 8, 2010

(87) PCT Pub. No.: WO2009/142302
PCT Pub. Date: Nov. 26, 2009

(65) Prior Publication Data
US 2010/0275594 A1    Nov. 4, 2010

(30) Foreign Application Priority Data

May 23, 2008   (JP) ................................. 2008-135854

(51) Int. Cl.
*B60K 6/20*   (2007.10)
*F01N 5/02*   (2006.01)

(52) U.S. Cl.
USPC ............................................. 60/597; 60/716

(58) Field of Classification Search
USPC ........... 60/520, 597, 599, 604, 614, 616, 618, 60/716, 717
See application file for complete search history.

(56) References Cited

U.S. PATENT DOCUMENTS

| | | | | |
|---|---|---|---|---|
| 1,011,520 A | * | 12/1911 | Stocks | 60/618 |
| 3,717,993 A | * | 2/1973 | Potter | 60/517 |
| 3,941,012 A | * | 3/1976 | Mayer | 74/661 |
| 4,148,192 A | * | 4/1979 | Cummings | 60/716 |
| 4,392,457 A | * | 7/1983 | Martin | 123/1 R |
| 4,442,805 A | * | 4/1984 | Yamakawa | 123/198 F |
| 5,337,562 A | * | 8/1994 | Kleinwachter et al. | 60/519 |
| 6,557,343 B2 | * | 5/2003 | Furudate | 60/324 |
| 6,761,030 B2 | * | 7/2004 | Niikura et al. | 60/618 |

(Continued)

FOREIGN PATENT DOCUMENTS

| JP | A-2002-266701 | 9/2002 |
|---|---|---|
| JP | A-2004-211660 | 7/2004 |

(Continued)

OTHER PUBLICATIONS

International Search Report issued in international Application No. PCT/JP2009/059451 on Jun. 23, 2009 (with translation).

*Primary Examiner* — Thomas Denion
*Assistant Examiner* — Mickey France
(74) *Attorney, Agent, or Firm* — Oliff PLC

(57) ABSTRACT

An exhaust heat recovery system includes a plurality of Starling engines. Heaters of the Starling engines are disposed in an exhaust passage that is a heat medium passage. An inside of the exhaust passage is partitioned with a partitioning member into a first exhaust passage and a second exhaust passage. The heater of the Starling engine disposed on an upstream side in a flowing direction of exhaust gas is provided in the first exhaust passage, and the heater of the Starling engine disposed on a downstream side in the flowing direction of the exhaust gas is provided in the second exhaust passage.

13 Claims, 18 Drawing Sheets

(56) References Cited

U.S. PATENT DOCUMENTS

| | | | |
|---|---|---|---|
| 7,026,722 B1* | 4/2006 | Otting et al. | 290/1 R |
| 7,047,745 B1* | 5/2006 | Yaoita | 60/706 |
| 7,252,177 B2* | 8/2007 | Minato | 181/240 |
| 7,290,388 B2* | 11/2007 | Kikuchi et al. | 60/323 |
| 8,250,869 B2* | 8/2012 | Sawada et al. | 60/624 |
| 2003/0089110 A1* | 5/2003 | Niikura et al. | 60/618 |
| 2003/0192306 A1* | 10/2003 | Nakatani et al. | 60/288 |
| 2004/0231323 A1* | 11/2004 | Fujita et al. | 60/284 |
| 2005/0000213 A1* | 1/2005 | Cameron | 60/517 |
| 2006/0053771 A1 | 3/2006 | Murata | |
| 2007/0142165 A1* | 6/2007 | Klinkner et al. | 477/3 |
| 2007/0169477 A1 | 7/2007 | Mori | |
| 2008/0072751 A1* | 3/2008 | Sawada et al. | 92/172 |
| 2009/0013686 A1 | 1/2009 | Yaguchi et al. | |
| 2010/0043427 A1* | 2/2010 | Sawada et al. | 60/597 |
| 2010/0275594 A1* | 11/2010 | Katayama et al. | 60/597 |

FOREIGN PATENT DOCUMENTS

| | | |
|---|---|---|
| JP | A-2007-187139 | 7/2007 |
| JP | A-2007-205273 | 8/2007 |
| WO | WO 2004/101983 A1 | 11/2004 |

* cited by examiner

US 8,776,516 B2

EXHAUST HEAT RECOVERY SYSTEM

TECHNICAL FIELD

The present invention relates to an exhaust heat recovery system for recovering heat energy of exhaust gas exhausted from an internal-combustion engine.

BACKGROUND ART

There is an exhaust heat recovery apparatus for recovering exhaust heat from the internal-combustion engine mounted on a vehicle such as a passenger car, a bus, and a truck by using a thermal engine. As the exhaust heat recovery apparatus used for this purpose, there is a Stirling engine, for example, excellent in theoretical thermal efficiency. Patent Document 1 discloses an apparatus in which a heater of a first Stirling engine and a heater of a second Stirling engine are provided in a passage of exhaust gas exhausted from an internal-combustion engine, the first Stirling engine is disposed on a downstream side of an exhaust gas purification catalyst, and the second Stirling engine is disposed on an upstream side of the exhaust gas purification catalyst.

Patent Document 1: Japanese Patent Application Laid-open No. 2007-187139

DISCLOSURE OF INVENTION

Problem to be Solved by the Invention

In the technique disclosed in the Patent Document 1, the heaters of respective heat exchangers overlap a flow of the exhaust gas and therefore the exhaust gas heat energy of which has been recovered by the heater on the upstream side in a flowing direction of the exhaust gas and temperature of which has reduced is introduced into the heater on the downstream side in the flowing direction of the exhaust gas. Moreover, the exhaust gas exhausted from the internal-combustion engine is first introduced into the heater disposed on the upstream side and therefore the exhaust gas is less likely to flow into the heater disposed on the downstream side. As a result, a difference may be caused in generated power between the plurality of Stirling engines.

The present invention has been made with the above circumstances and an object of the present invention is to reduce a difference in generated power between the respective exhaust heat recovery engines when the plurality of exhaust heat recovery engines are used to recover exhaust heat.

Means for Solving Problem

In order to achieve the above mentioned object, an exhaust heat recovery system according to the present invention includes a plurality of exhaust heat recovery engines each of which includes a heater for giving heat energy of a heat medium exhausted from an exhaust heat recovery target to working fluid, and generates power by heat energy of the heat medium; and heat medium passages that are provided at least the same number of the exhaust heat recovery engines and cause the heat medium to pass through, wherein the heater provided to each of the exhaust heat recovery engines is provided in each of the heat medium passages, and the respective heaters are oriented from an upstream side toward a downstream side in a flowing direction of the heat medium.

As a desirable aspect of the present invention, in the exhaust heat recovery system, it is preferred that the respective heat medium passages are formed by partitioning a single pipe with a partitioning member provided between the heaters provided to the respective exhaust heat recovery engines.

As a desirable aspect of the present invention, in the exhaust heat recovery system, it is preferred that a heat insulator is provided between the heater disposed on the upstream side in the flowing direction of the heat medium and the heat medium passage provided with the heater disposed on the downstream side in the flowing direction of the heat medium.

As a desirable aspect of the present invention, in the exhaust heat recovery system, it is preferred that the respective heat medium passages are formed of different pipes independent of each other.

As a desirable aspect of the present invention, in the exhaust heat recovery system, it is preferred that the respective heaters are displaced from each other in opposite directions in a direction orthogonal to central axes of output shafts of the exhaust heat recovery engines.

As a desirable aspect of the present invention, in the exhaust heat recovery system, it is preferred that the respective output shafts of the plurality of exhaust heat recovery engines are connected to each other.

Effect of the Invention

The present invention can reduce the difference in the generated power between the respective exhaust heat recovery engines when the plurality of exhaust heat recovery engines are used to recover the exhaust heat.

BRIEF DESCRIPTION OF DRAWINGS

FIG. 3-1 is a schematic diagram illustrating a configuration example when an exhaust heat recovery system according to the first embodiment is used to recover exhaust heat of an internal-combustion engine mounted on a vehicle.

FIG. 3-2 is a side view illustrating a state in which the exhaust heat recovery system according to the first embodiment is mounted on the vehicle.

FIG. 3-3 is a front view illustrating a state in which the exhaust heat recovery system according to the first embodiment is mounted on the vehicle.

BEST MODE(S) FOR CARRYING OUT THE INVENTION

The present invention will be described below in detail with reference to the drawings. The following description does not limit the present invention. Constituent features in the following description include those easily anticipated by a person skilled in the art, substantially similar ones, and those in what is called an equivalent scope.

First Embodiment

In the following description, a Stirling engine that is an external-combustion engine will be taken as an example of an exhaust heat recovery engine. Although the Stirling engines that are exhaust heat recovery engines are used to recover heat energy of exhaust gas exhausted from an internal-combustion engine mounted on a vehicle or the like, i.e., exhaust heat recovery is intended for the internal combustion engine in an example described below, the exhaust heat recovery is not necessarily intended for it. In the first embodiment, the exhaust heat recovery may also be intended for factories, plants, or electric generating facilities.

The first embodiment is characterized in that it includes a plurality of exhaust heat recovery engines for recovering the heat energy of a heat medium, i.e., the exhaust gas exhausted from the internal-combustion engine and at least the same number of heat medium passages as the exhaust heat recovery engines for letting the heat medium exhausted from the internal-combustion engine, i.e., the exhaust gas through. Heaters provided to the respective exhaust heat recovery engines are disposed in the respective heat medium passages and the respective heaters are oriented from an upstream side toward a downstream side in a flowing direction of the heat medium. First, a structure of the Stirling engine that is the exhaust heat recovery engine constituting the exhaust heat recovery system according to the first embodiment will be described.

Figure 1:
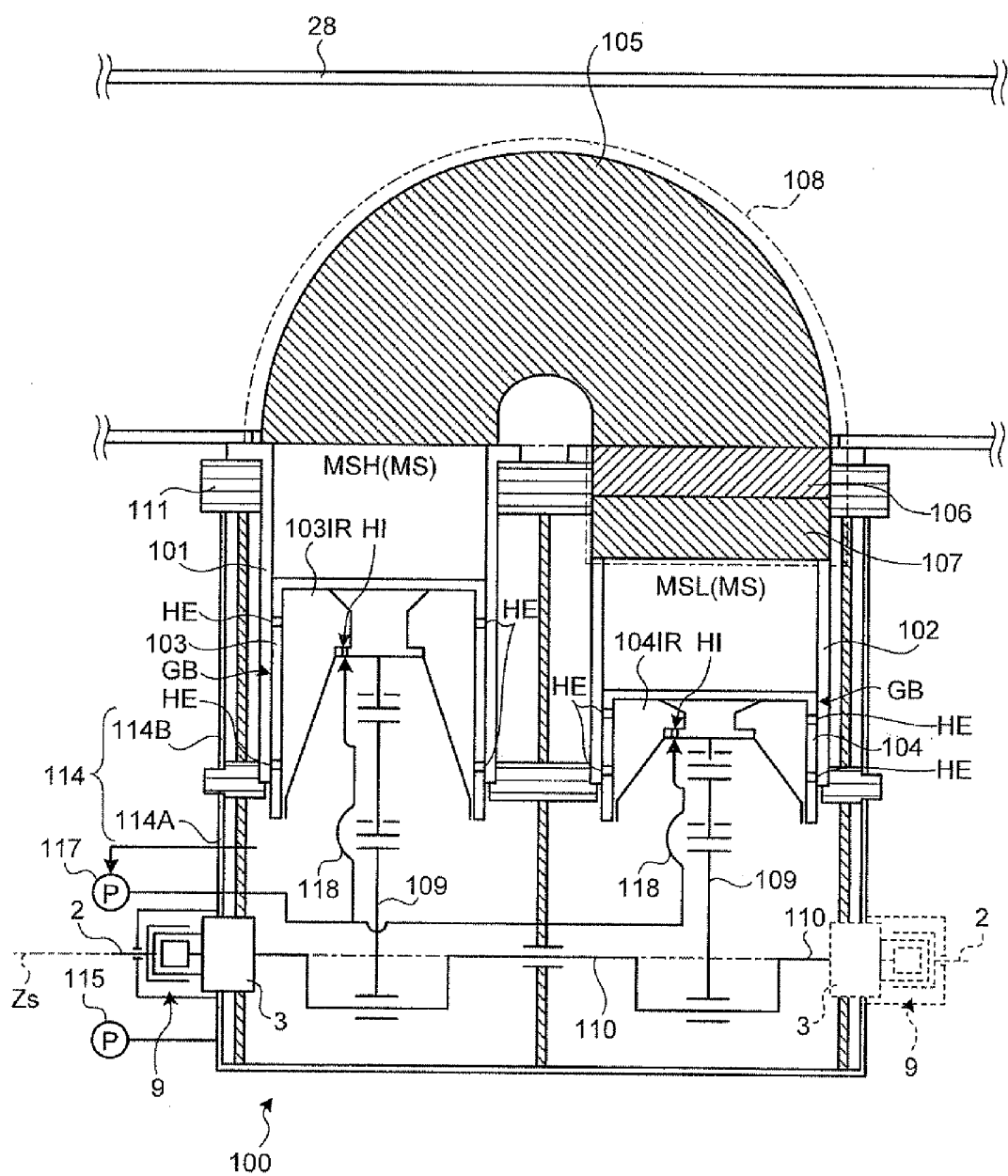
FIG. 1 is a sectional view illustrating a Stirling engine according to a first embodiment.
Figure 2:
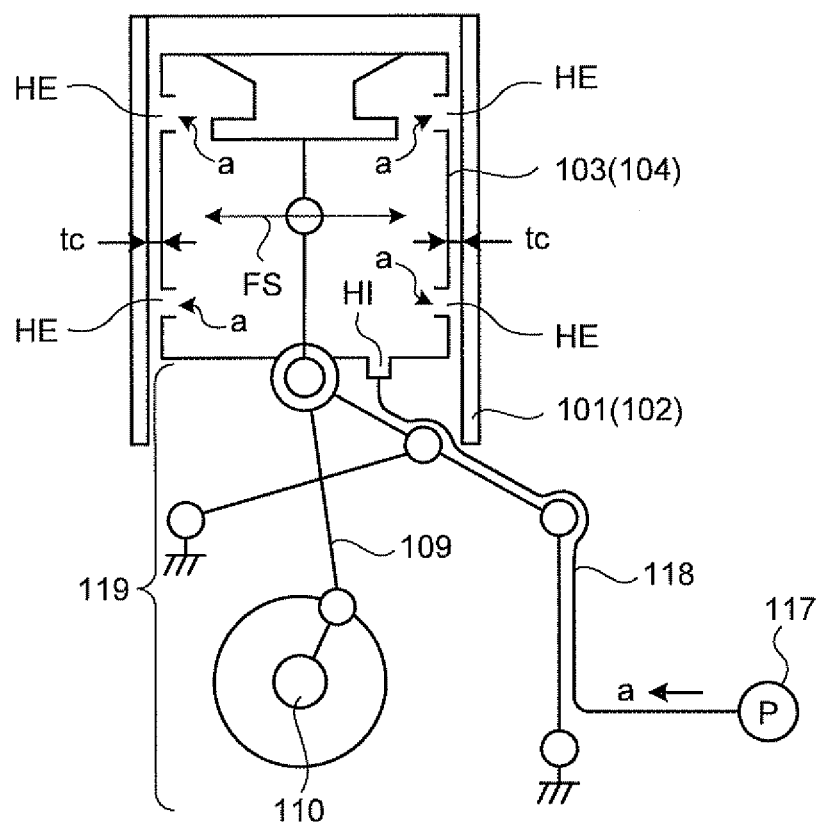
FIG. 2 is a sectional view illustrating an example of a structure of a gas bearing provided to the Stirling engine according to the first embodiment and an example of a structure of an approximate straight-line mechanism used for supporting a piston.

FIG. 1 is a sectional view illustrating the Stirling engine according to the first embodiment. FIG. 2 is a sectional view illustrating an example of a structure of a gas bearing provided to the Stirling engine according to the first embodiment and an example of a structure of an approximate straight-line mechanism used for supporting a piston. A Stirling engine 100 is what is called an external-combustion engine, converts heat energy possessed by exhaust gas (corresponding to the heat medium) exhausted from the thermal engine such as the internal-combustion engine as an exhaust heat recovery target into kinetic energy, and takes it out as rotational movement of a crankshaft 110. The crankshaft 110 functions as an output shaft of the Stirling engine 100. The crankshaft 110 rotates about a rotational axis (exhaust heat recovery engine rotational axis) Zs. The exhaust heat recovery engine rotational axis Zs is a central axis of the crankshaft 110 that is the output shaft of the Stirling engine 100.

In the first embodiment, the Stirling engine 100 is an α-type in-line two-cylinder Stirling engine. In the Stirling engine 100, a high temperature side piston 103 that is a first piston housed in a high temperature side cylinder 101 that is a first cylinder and a low temperature side piston 104 that is a second piston housed in a low temperature side cylinder 102 that is a second cylinder are arranged in a line, i.e., in series. The Stirling engine 100 is a reciprocating thermal engine in which the high temperature side piston 103 reciprocates in the high temperature side cylinder 101 and the low temperature side piston 104 reciprocates in the low temperature side cylinder 102.

The high temperature side cylinder 101 and the low temperature side cylinder 102 are directly or indirectly supported and fixed onto a base plate 111 that is a reference body. In the Stirling engine 100 according to the first embodiment, the base plate 111 serves as a positional reference of the respective components of the Stirling engine 100. With this structure, it is possible to achieve accuracy in relative positions of the respective components.

As described below, the Stirling engine 100 according to the first embodiment has the gas bearings GB between the high temperature side cylinder 101 and the high temperature side piston 103 and between the low temperature side cylinder 102 and the low temperature side piston 104. By directly or indirectly mounting the high temperature side cylinder 101 and the low temperature side cylinder 102 onto the base plate 111 that is the reference body, it is possible to accurately retain clearances between the pistons and the cylinders and therefore the gas bearings GB can sufficiently exert their functions. Moreover, assembly of the Stirling engine 100 becomes easy.

Between the high temperature side cylinder 101 and the low temperature side cylinder 102, a heat exchanger 108 including a substantially U-shaped heater (heater) 105, a regenerator 106, and a cooler 107 is disposed. By forming the heater 105 into the substantially U shape in this way, it is possible to easily dispose the heater 105 in a relatively narrow space such as an exhaust passage of the internal-combustion engine. Moreover, by disposing the high temperature side cylinder 101 and the low temperature side cylinder 102 in series as in the Stirling engine 100, it is possible to relatively easily dispose the heater 105 in a cylindrical space such as the exhaust passage of the internal-combustion engine. At least the heater 105 out of the components of the heat exchanger 108 is disposed in the exhaust passage (corresponding to the heat medium passage) of the internal-combustion engine for which the exhaust heat recovery is intended.

The heater 105 is connected at one end portion to the high temperature side cylinder 101 and connected at the other end portion to the regenerator 106. The regenerator 106 is connected at one end portion to the heater 105 and connected at the other end portion to the cooler 107. The cooler 107 is connected at one end portion to the regenerator 106 and connected at the other end portion to the low temperature side cylinder 102. Working fluid (air in the first embodiment) is encapsulated in the high temperature side cylinder 101, the low temperature side cylinder 102, and the heat exchanger 108 and flows between the high temperature side cylinder 101 and the heater 105, between the heater 105 and the regenerator 106, between the regenerator 106 and the cooler 107, and between the cooler 107 and the low temperature side cylinder 102.

With this structure, the heat energy of the exhaust gas is given by the heater 105 to the working fluid and heat is radiated from the working fluid in the cooler 107 to form a Stirling cycle. In this way, the Stirling engine 100 generates power. The power generated by the Stirling engine 100 is taken out of the crankshaft 110. Here, a space inside the high temperature side cylinder 101 and containing the working fluid is referred to as a high temperature side working space MSH and a space inside the low temperature side cylinder 102 and containing the working fluid is referred to as a low temperature side working space MSL. When no distinction is drawn between them, they are merely referred to as a working space MS. The working space MS is a space where the working fluid in it is expanded or compressed.

The heater 105 and the cooler 107 may be formed of bunches of a plurality of tubes made of material (such as copper and copper alloy) having high heat conductivity and excellent heat resistance, for example. The regenerator 106 can be formed of a porous heat storage body. The structures of the heater 105, the cooler 107, and the regenerator 106 are not limited to those in this example but can be suitable structures that are selected according to heat conditions of a heat source, specifications of the Stirling engine 100, and the like.

The high temperature side piston 103 and the low temperature side piston 104 are supported in the high temperature side cylinder 101 and the low temperature side cylinder 102 through the gas bearings GB. In other words, the pistons are reciprocated in the cylinders without using lubricating oil. In this way, it is possible to reduce friction between the pistons and cylinders to thereby enhance thermal efficiency of the Stirling engine 100. Moreover, by reducing the friction between the pistons and the cylinders, the Stirling engine 100 can operate to recover the heat energy even in recovering the exhaust heat under operating conditions of a low heat source and a small temperature difference as in recovery of the heat energy from the exhaust gas of the internal-combustion engine, for example.

To form the gas bearing GB, a clearance tc between the high temperature side piston 103 and the high temperature side cylinder 101 shown in FIG. 2 is greater than ten micrometers and smaller than or equal to tens of micrometers throughout circumferences of the high temperature side piston 103 and the high temperature side cylinder 101. The low temperature side piston 104 and the low temperature side cylinder 102 have a similar structure, as well. The high temperature side cylinder 101, the high temperature side piston 103, the low temperature side cylinder 102, and the low temperature side piston 104 can be formed by using metallic material that is easy to work, for example.

In the first embodiment, gas (the same air as the working fluid in the first embodiment) a flows from air supply openings HE provided to side walls of the high temperature side piston 103 and the low temperature side piston 104 to form the gas bearings GB. As shown in FIGS. 1 and 2, a high temperature side intra-piston space 103IR and a low temperature side intra-piston space 104IR are formed in the high temperature side piston 103 and the low temperature side piston 104, respectively.

The high temperature side piston 103 is provided with a gas introducing opening HI for supplying the gas a into the high temperature side intra-piston space 103IR, and the low temperature side piston 104 is provided with a gas introducing opening HI for supplying the gas a into the low temperature side intra-piston space 104IR. To each of the gas introducing openings HI, a gas supply pipe 118 is connected. The gas supply pipe 118 has one end connected to a gas bearing pump 117 and introduces the gas a discharged from the gas bearing pump 117 into the high temperature side intra-piston space 103IR and the low temperature side intra-piston space 104IR.

The gas a introduced into the high temperature side intra-piston space 103IR and the low temperature side intra-piston space 104IR flows out through the air supply openings HE provided to the side wall of the high temperature side piston 103 and the low temperature side piston 104 to form the gas bearing GB. These gas bearings GB are static pressure gas bearings. Although the gas bearings GB in the first embodiment are the static pressure gas bearings, dynamic pressure gas bearings may be used as well.

Reciprocating movement of each of the high temperature side piston 103 and the low temperature side piston 104 is transmitted by a connecting rod 109 to the crankshaft 110 that is the output shaft and converted into the rotational movement. The connecting rod 109 may be supported by an approximate straight-line mechanism (such as a grasshopper mechanism and a watt link mechanism) 119 shown in FIG. 2. In this way, it is possible to reciprocate the high temperature side piston 103 and the low temperature side piston 104 substantially straight.

If the connecting rod 109 is supported by the approximate straight-line mechanism 119, side force FS (force in a radial direction of the piston) of the high temperature side piston 103 becomes substantially zero and therefore even the gas bearings GB with a low load capacity can satisfactorily support the high temperature side piston 103 and the low temperature side piston 104. In the first embodiment, the approximate straight-line mechanism 119 supports most of the side force FS and the gas bearing GB supports the side force FS generated when the reciprocating movement of the low temperature side piston 104 or the like deviates from approximate straight-line movement.

As shown in FIG. 1, the respective components such as the high temperature side cylinder 101, the high temperature side piston 103, the connecting rod 109, and the crankshaft 110 constituting the Stirling engine 100 are housed in a casing 114. Here, the casing 114 of the Stirling engine 100 includes a crankcase 114A and a cylinder block 114B. An inside of the casing 114 is pressurized by a pressurizing pump 115 that is a means for pressurizing the inside of the casing. If the pressurizing pump 115 pressurizes the inside of the casing 114 to pressurize the working fluid in the high temperature side working space MSH, the low temperature side working space MSL, and the heat exchanger 108, a capacity of the working fluid when the working fluid takes in the heat energy increases. In this way, it is possible to take more output out of the crankshaft 110 that is the output shaft of the Stirling engine 100.

If the Stirling engine 100 generates a specified output, the inside of the casing 114 is pressurized at specified pressure (e.g., about 1 MPa), for example. Therefore, a structure for retaining airtightness between the crankshaft 110 and the casing 114 is necessary to take the rotational movement of the crankshaft 110 out of the casing 114. In the first embodiment, as shown in FIG. 1, an output of the crankshaft 110 is taken out of the casing 114 via a magnetic coupling 9 for transmitting rotation of the crankshaft 110 to a driven shaft (magnetic coupling driven shaft) 2 without contact. In other words, the output of the Stirling engine 100 is taken out of the driven shaft 2 provided to the magnetic coupling 9.

As described above, the driven shaft 2 serves as an output shaft of the Stirling engine 100. The driven shaft 2 rotates about the exhaust heat recovery engine rotational axis Zs. The exhaust heat recovery engine rotational axis Zs is a central axis of the driven shaft 2 that is the output shaft of the Stirling engine 100. Instead of the magnetic coupling 9, seal bearings may be provided between the crankshaft 110 and the crankcase 114A constituting the casing 114 to retain airtightness between the crankshaft 110 and the casing 114.

Here, as shown in FIG. 1, a speed increasing gear 3 that is a converting means for changing torque of the crankshaft 110 and outputting it may be provided and rotational speed of the crankshaft 110 may be increased and input to the magnetic coupling 9. In this way, the torque of the crankshaft 110 can be reduced to suppress a torque transmission capacity of the magnetic coupling 9. To start the Stirling engine 100, an output of a starting means such as an electric motor is input to the driven shaft 2 to rotate the crankshaft 110. In this case, the speed increasing gear 3 functions as a speed reducing gear. As a result, it is possible to suppress the torque transmission capacity of the magnetic coupling 9.

In the Stirling engine 100 shown in FIG. 1, the magnetic coupling 9 and the speed increasing gear 9 are disposed on the high temperature side cylinder 101 side. To connect the crankshafts 110 of the two Stirling engines 100, a magnetic coupling (input magnetic coupling) 91 is disposed on the low temperature side cylinder 102 side as well. Then, a driven shaft of the input magnetic coupling 9I provided to one of the Stirling engines 100 and the driven shaft 2 of the magnetic coupling 9 provided to the other Stirling engine 100 can be connected. In this way, it is possible to combine and take out power generated by the two Stirling engines 100. To use a single Stirling engine 100, the magnetic coupling 9 may be disposed on the high temperature side cylinder 101 side or the low temperature side cylinder 102 side.

Figures 1, 3:
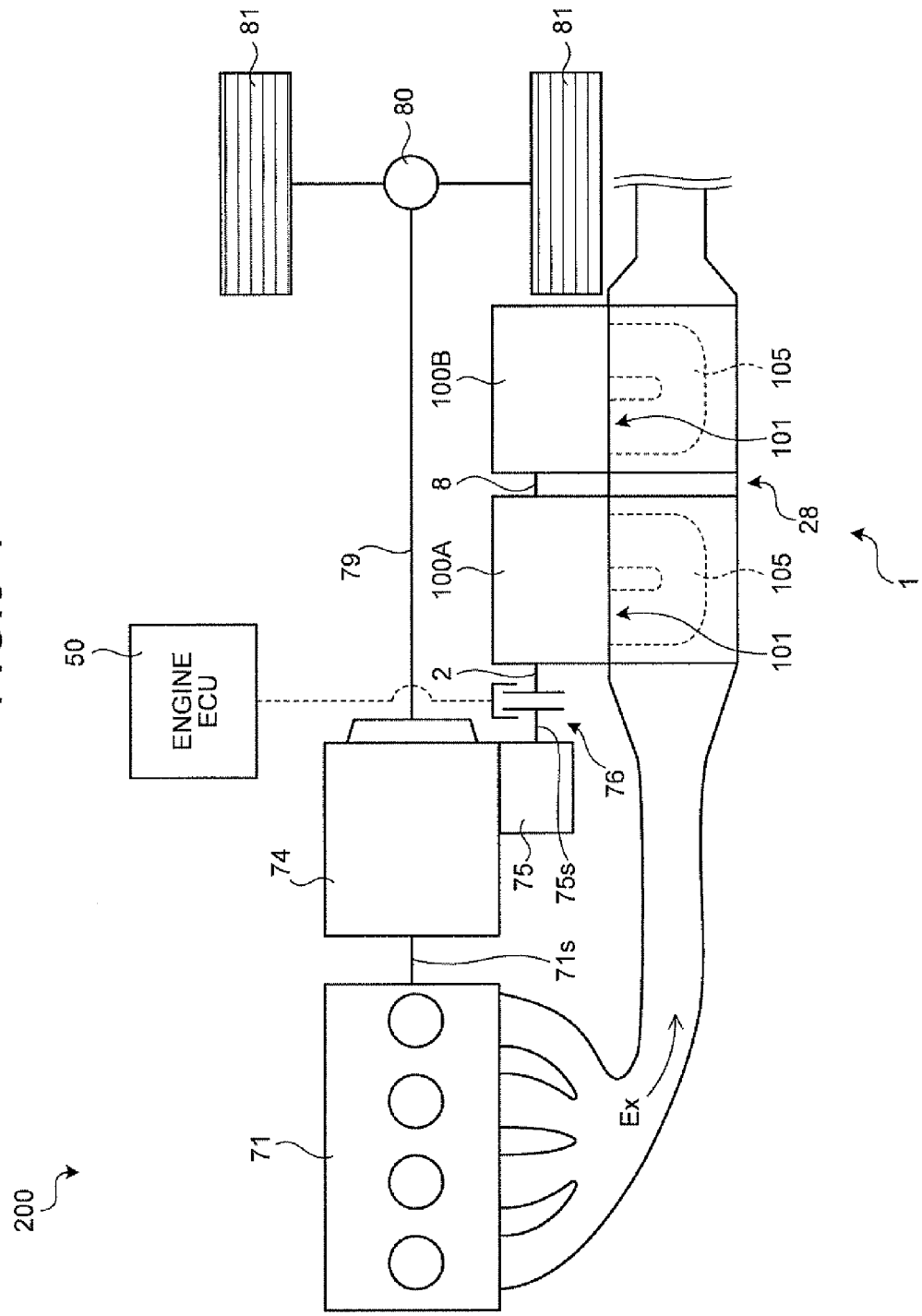
Figures 2, 3:
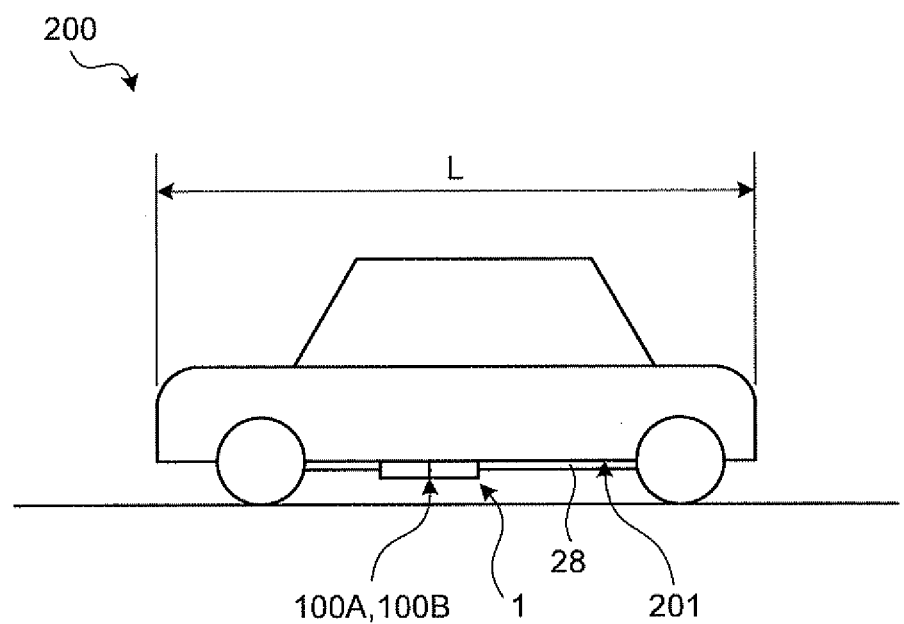
Figure 3:
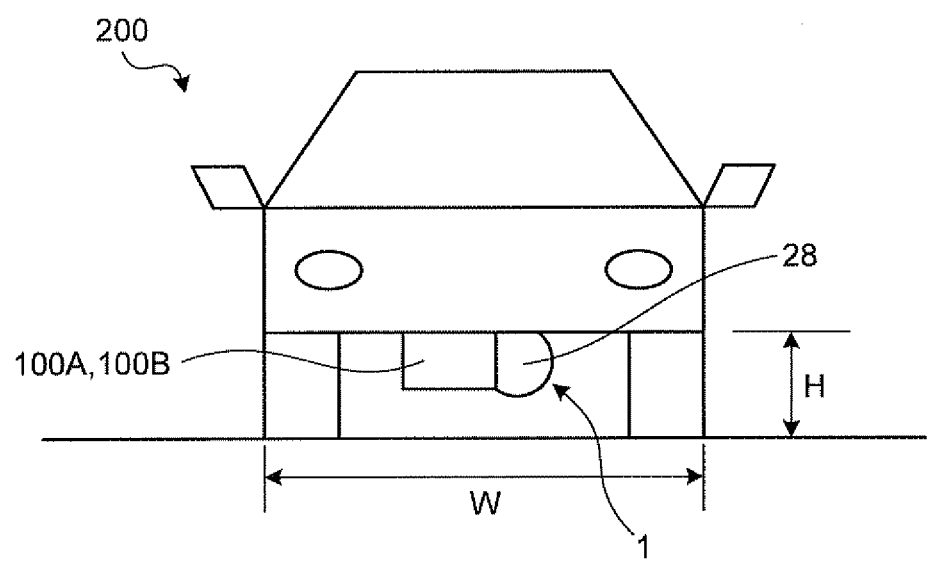

FIG. 3-1 is a schematic diagram illustrating a configuration example when the exhaust heat recovery system according to the first embodiment is used to recover the exhaust heat of the internal-combustion engine mounted on the vehicle. FIG. 3-2 is a side view illustrating a state in which the exhaust heat recovery system according to the first embodiment is mounted on the vehicle. FIG. 3-3 is a front view illustrating a state in which the exhaust heat recovery system according to the first embodiment is mounted on the vehicle. An exhaust heat recovery system 1 according to the first embodiment includes a plurality of (two in the first embodiment) Stirling engines 100A and 100B. The respective heaters 105 of the Stirling engines 100A and 100B are disposed in an exhaust passage 28 of an internal-combustion engine 71 for which exhaust heat recovery is intended, to recover the heat energy of exhaust gas Ex exhausted from the internal-combustion engine 71. The respective heaters of the Stirling engines 100A and 100B are oriented from the upstream side toward the downstream side in the flowing direction of the exhaust gas Ex. Therefore, the Stirling engines 100A and 100B are oriented from the upstream side toward the downstream side in the flowing direction of the exhaust gas Ex as well.

In the first embodiment, the internal-combustion engine 71 is mounted on a vehicle 200 such as a passenger car and a truck, for example, and powers the vehicle 200. The internal-combustion engine 71 as a main power source generates power during traveling of the vehicle 200 and causes the vehicle 200 to travel. On the other hand, the Stirling engines 100A and 100B cannot generate minimum necessary outputs until temperature of the exhaust gas Ex reaches a certain temperature. Therefore, in the first embodiment, the Stirling engines 100A and 100B recover the heat energy from the exhaust gas Ex of the internal-combustion engine 71 to generate the outputs and cause the vehicle 200 to travel in cooperation with the internal-combustion engine 71 when the temperature of the exhaust gas Ex exhausted from the internal-combustion engine 71 exceeds a predetermined temperature. In this manner, Stirling engines 100A and 100B serve as auxiliary power sources of the vehicle 200.

In the first embodiment, the heat energy of the exhaust gas Ex recovered by using the Stirling engines 100A and 100B is converted by the Stirling engines 100A and 100B into the kinetic energy. The output shafts of the Stirling engines 100A and 100B are connected by a connecting shaft 8. In this way, in the first embodiment, the power of the Stirling engines 100A and 100B is combined and taken out of the driven shaft 2 that is the output shaft of the Stirling engine 100A. A clutch 76 that is a power interrupting means is attached to the driven shaft 2 and the outputs of the Stirling engines 100A and 100B are transmitted to a Stirling engine transmission 75 via the clutch 76.

An output of the internal-combustion engine 71 is input to an internal-combustion engine transmission 74 via an output shaft 71s of the internal-combustion engine 71. Then, the internal-combustion engine transmission 74 combines power of the internal-combustion engine 71 and the power of the Stirling engines 100 output from the Stirling engine transmission 75 and outputs the combined power to a transmission output shaft 79 to drive driving wheels 81 via a differential gear 80.

Here, the clutch 76 that is the power interrupting means is provided between the internal-combustion engine transmission 74 and the Stirling engine 100A. In the first embodiment, the clutch 76 is provided between an input shaft 75s of the Stirling engine transmission 75 and the driven shaft 2 of the Stirling engine 100. The clutch 76 is engaged or disengaged to thereby mechanically connect or disconnect the driven shaft 2 of the Stirling engine 100A and the input shaft 75s of the Stirling engine transmission 75 to or from each other. Here, the clutch 76 is controlled by an engine ECU (electronic control unit) 50.

If the clutch 76 is engaged, the driven shaft 2 of the Stirling engine 100A and the output shaft 71s of the internal-combustion engine 71 are directly connected via the Stirling engine transmission 75 and the internal-combustion engine transmission 74. As a result, the power generated by the Stirling engines 100A and 100B and the power generated by the internal-combustion engine 71 are combined by the internal-combustion engine transmission 74 and taken out of the transmission output shaft 79. On the other hand, if the clutch 76 is disengaged, the output shaft 71s of the internal-combustion engine 71 is disconnected from the driven shaft 2 of the Stirling engine 100A and rotates. In this way, in the first embodiment, the power of the plurality of Stirling engines 100A and 100B constituting the exhaust heat recovery system 1 is input to the internal-combustion engine transmission 74 via the Stirling engine transmission 75, combined with the power of the internal-combustion engine 71, and taken out to cause the vehicle 200 to travel.

As shown in FIGS. 3-2 and 3-3, the Stirling engines 100A and 100B constituting the exhaust heat recovery system 1 are mounted on a road surface side of a floor 201 of the vehicle 200, i.e., in an underfloor space. Because the underfloor space of the vehicle 200 is small in general, it is difficult to arrange the Stirling engines 100A and 100B in a height direction H in mounting the Stirling engines 100A and 100B in the underfloor space of the vehicle 200. On the other hand, because there are certain amounts of room in a longitudinal direction L and a width direction W of the vehicle 200, it is relatively easy to arrange the Stirling engines 100A and 100B in the longitudinal direction L and the width direction W of the vehicle 200. Moreover, a flowing direction of the exhaust gas Ex from the internal-combustion engine 71 mounted on the vehicle 200 is the longitudinal direction of the vehicle 200. Therefore, if the Stirling engines 100A and 100B are disposed in the underfloor space of the vehicle 200, it is rational to arrange them in the longitudinal direction L of the vehicle 200 as in the first embodiment.

Figure 4:
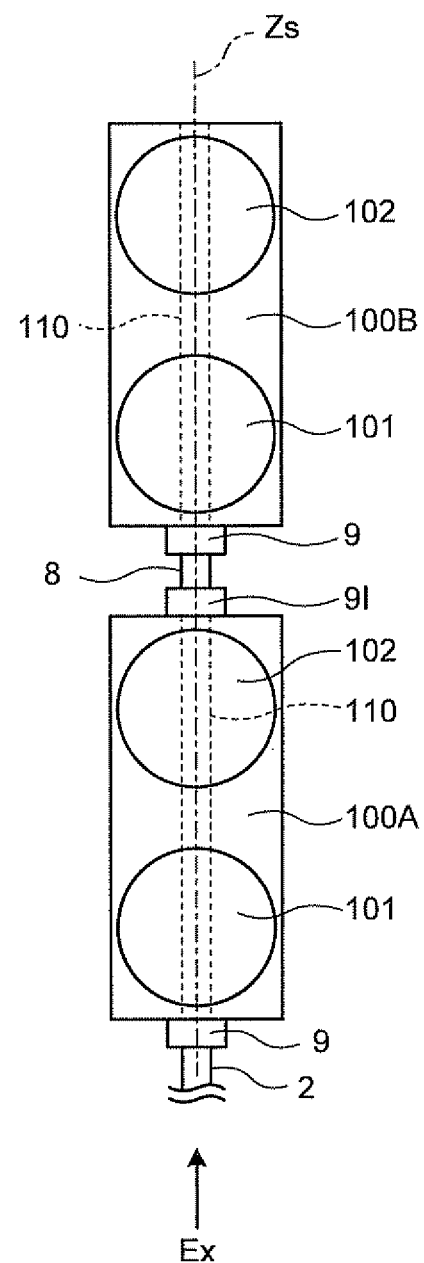
FIG. 4 is a schematic diagram illustrating a method of connecting output shafts of the Stirling engines in the exhaust heat recovery system according to the first embodiment.

FIG. 4 is a schematic diagram illustrating a method of connecting the output shafts of the Stirling engines in the exhaust heat recovery system according to the first embodiment. In the Stirling engines 100A and 100B constituting the exhaust heat recovery system 1, the magnetic coupling 9 of the Stirling engine 100B and the input magnetic coupling 9I of the Stirling engine 100A are connected by the connecting shaft 8.

The crankshaft 110 of the Stirling engine 100B is connected to the magnetic coupling 9 and the input magnetic coupling 9I of the Stirling engine 100A is connected to the crankshaft 110 of the Stirling engine 100A. With this structure, the crankshaft 110 of the Stirling engine 100B is connected to the crankshaft 110 of the Stirling engine 100A via the magnetic coupling 9, the connecting shaft 8, and the input magnetic coupling 9I.

As described above, instead of the magnetic coupling 9 and the input magnetic coupling 9I, the seal bearings may be provided between the crankshafts 110 and the crankcases 114A shown in FIG. 1 to directly take the crankshafts 110 out of the crankcases 114A. In this case, the respective crankshaft 110 of the Stirling engines 100A and 100B are connected by a joint, for example. In this way, in the first embodiment, the crankshafts 110 of the respective Stirling engines 100A and 100B are indirectly or directly connected.

By connecting the crankshafts 110 provided to the respective Stirling engines 100A and 100B, the power generated by the respective Stirling engines 100A and 100B is combined. The combined power of the Stirling engines 100A and 100B is output from the driven shaft 2 forming the magnetic coupling 9 of the Stirling engine 100A and then combined with the power of the internal-combustion engine 71 as described above.

As shown in FIG. 4, the Stirling engine 100A disposed on the upstream side in the flowing direction of the exhaust gas Ex and the Stirling engine 100B disposed on the downstream side of the Stirling engine 100A in the flowing direction of the exhaust gas Ex have their high temperature side cylinders 101 disposed on the upstream side in the flowing direction of the exhaust gas Ex. Therefore, the high-temperature exhaust gas Ex flows on sides of the high temperature side cylinders 101 of the heaters 105 to thereby efficiently heat working fluid flowing into the high temperature side cylinders 101. As a result, it is possible to increase temperatures of the working fluid flowing into the high temperature side cylinders 101 to thereby enhance the thermal efficiency of the Stirling engines 100A and 100B.

Figure 5:
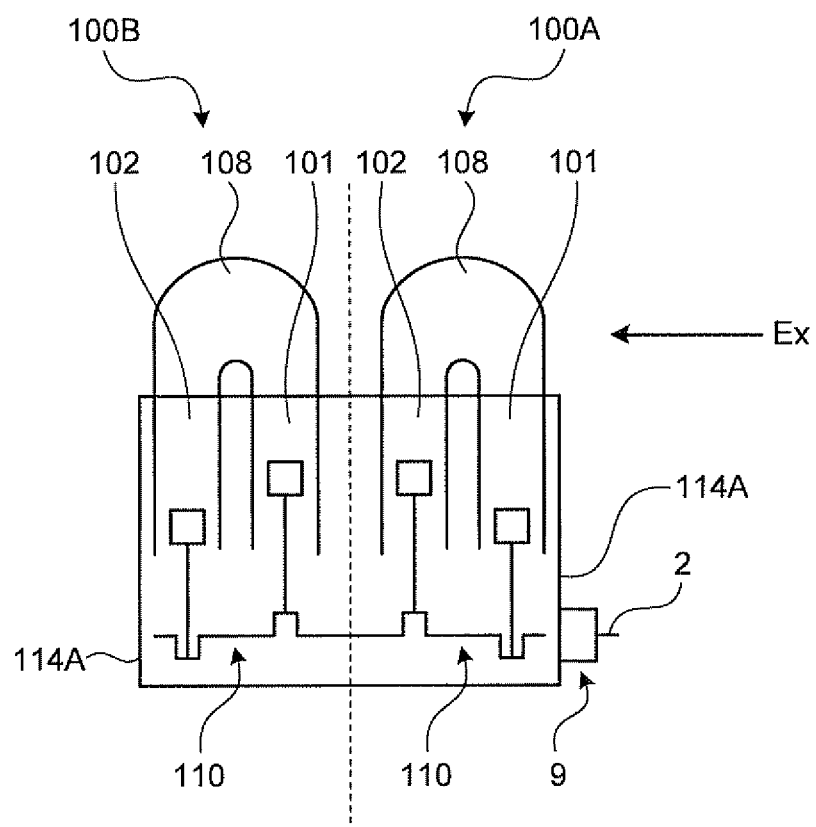
FIG. 5 is a schematic diagram illustrating another configuration example of the Stirling engines constituting the exhaust heat recovery system according to the first embodiment.

FIG. 5 is a schematic diagram illustrating another configuration example of the Stirling engines constituting the exhaust heat recovery system according to the first embodiment. In this example, the plurality of (more specifically, two) Stirling engines 100A and 100B share the crankcase 114A and the crankshaft 110. The Stirling engine 100A is disposed on the upstream side in the flowing direction of the exhaust gas Ex and the Stirling engine 100B is disposed on the downstream side of the Stirling engine 100A in the flowing direction of the exhaust gas Ex. In the downstream direction of the exhaust gas Ex, the high temperature side cylinder 101 and the low temperature side cylinder 102 of the Stirling engine 100A and the high temperature side cylinder 101 and the low temperature side cylinder 102 of the Stirling engine 100B are arranged in this order.

The crankshaft 110 of the Stirling engine 100A and the crankshaft 110 of the Stirling engine 100B are integral with each other and rotation of the crankshaft 110 is transmitted to the driven shaft 2 via the magnetic coupling 9. In the first embodiment, the Stirling engines 100A and 100B constituting the exhaust heat recovery system 1 shown in FIGS. 3-1 and the like may share the crankcase 114A and the crankshaft 110. In this way, the means of connecting the output shafts of the Stirling engines 100A and 100B becomes unnecessary and it is possible to reduce dimensions of the Stirling engines 100A and 100B in an output shaft direction.

In the first embodiment, a combination of the high temperature side cylinder 101, the heat exchanger 108, and the low temperature side cylinder 102 is defined as the one Stirling engine 100 and the engines sharing the crankshaft 110 and the crankcase 114A that is part of the casing are defined as the plurality of (two in the example in FIG. 5) Stirling engines 100A and 100B. Next, the exhaust heat recovery system according to the first embodiment will be described. In the following description, the connecting structure of the output shafts of the Stirling engines 100A and 100B and whether or not they share the case will not be considered.

Figure 6:
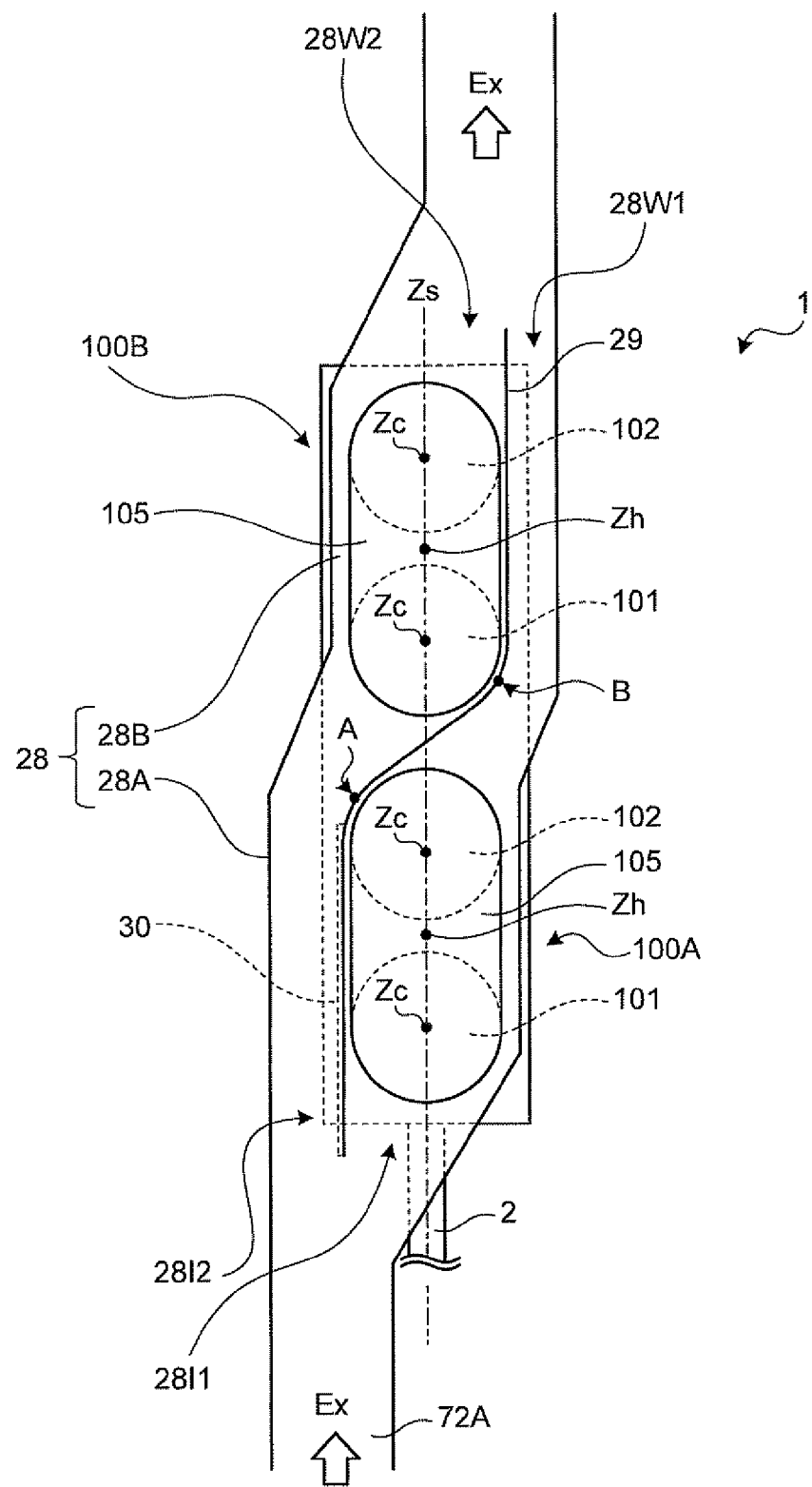
FIG. 6 is a plan view illustrating the exhaust heat recovery system according to the first embodiment.
Figure 7:
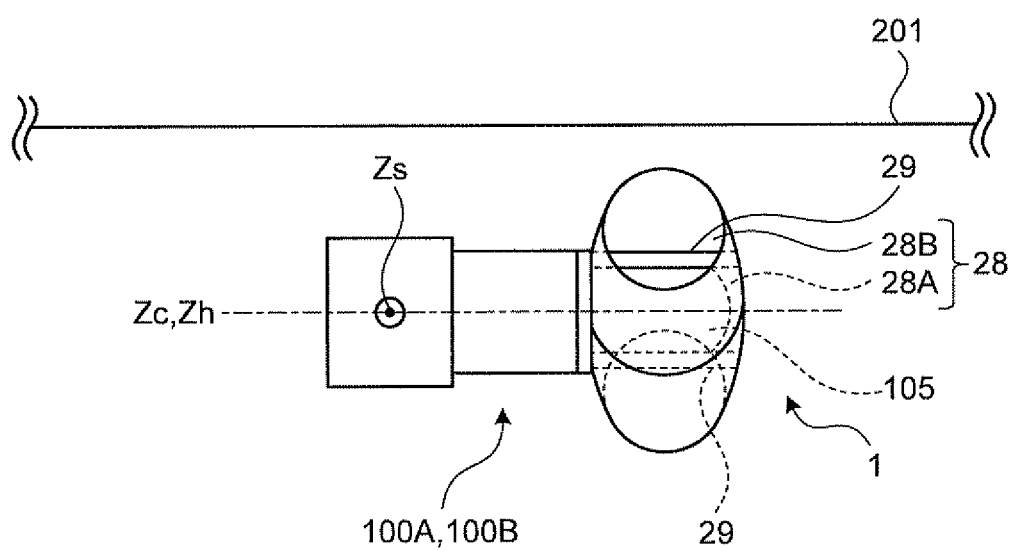
FIG. 7 is a front view illustrating the exhaust heat recovery system according to the first embodiment.

FIG. 6 is a side view illustrating the exhaust heat recovery system according to the first embodiment. FIG. 7 is a front view illustrating the exhaust heat recovery system according to the first embodiment. The exhaust heat recovery system 1 has the plurality of Stirling engines 100A and 100B and mounted between the floor 201 of the vehicle and the road surface, i.e., in the underfloor space of the vehicle. The heaters 105 of the respective Stirling engines 100A and 100B constituting the exhaust heat recovery system 1 are disposed in the exhaust passage 28 that is the heat medium passage.

The exhaust passage 28 includes a first exhaust passage (first heat medium passage) 28A for introducing the exhaust gas Ex into the Stirling engine 100A disposed on the upstream side in the flowing direction of the exhaust gas Ex (hereafter referred to as the upstream side) and a second exhaust passage (second heat medium passage) 28B for introducing the exhaust gas Ex into the Stirling engine 100B disposed on the downstream side of the Stirling engine 100A in the flowing direction of the exhaust gas Ex (hereafter referred to as the downstream side). As described above, there are at least the same number of exhaust passages 28 as the plurality of Stirling engines 100A and 100B. Here, each of the Stirling engines 100A and 100B has the same structure as the Stirling engine 100 shown in FIG. 1 and letters A and B are for making a distinction between the upstream side and the downstream side.

In the first embodiment, the Stirling engines 100A and 100B constituting the exhaust heat recovery system 1 are disposed with the high temperature side cylinder 101 and the low temperature side cylinder 102 of the Stirling engine 100A and the high temperature side cylinder 101 and the low temperature side cylinder 102 of the Stirling engine 100B arranged in a line in this order in the downstream direction of the exhaust gas Ex. In other words, respective cylinder central axes Zc are at the same angle with respect to the exhaust heat recovery engine rotational axes Zs. Both the high temperature side cylinders 101 of the Stirling engines 100A and 100B are disposed on the upstream side in the flowing direction of the exhaust gas Ex. The exhaust heat recovery engine rotational axes Zs of the respective Stirling engines 100A and 100B are disposed substantially parallel to the flowing direction of the exhaust gas Ex. Because the output shafts of the plurality of Stirling engines 100A and 100B are connected to each other as described above, the central axes of the output shafts, i.e. the exhaust heat recovery engine rotational axes Zs of the plurality of Stirling engines 100A and 100B coincide with each other. In this way, it is possible to reduce dimensions of the exhaust heat recovery system 1 in the longitudinal direction (direction of the exhaust heat recovery engine rotational axes Zs) and the width direction (direction orthogonal to the exhaust heat recovery engine rotational axes Zs and the cylinder central axes Zc).

In the exhaust heat recovery system 1, the heaters 105 are disposed substantially parallel to the cylinder central axes Zc when the Stirling engines 100A and 100B are seen in the direction of the exhaust heat recovery engine rotational axes Zs. In other words, central axes Zh of the heaters 105 are disposed substantially parallel to the cylinder central axes Zc. Therefore, if the Stirling engines 100A and 100B are seen in the direction of the exhaust heat recovery engine rotational axes Zs, the heater 105 of the Stirling engine 100B disposed on the downstream side is hidden behind the heater 105 of the Stirling engine 100A disposed on the upstream side as shown in FIG. 7. Therefore, if the exhaust passage 28 is formed of a single pipe and the heaters of the Stirling engines 100A and 100B are disposed in the single pipe, the exhaust gas becomes less liable to flow into the heater 105 of the Stirling engine 100B disposed on the downstream side. As a result, a difference in the power may be caused between the Stirling engine 100A and the Stirling engine 100B.

In the first embodiment, a partitioning member 29 is provided between the heater 105 of the upstream Stirling engine 100A and the heater 105 of the downstream Stirling engine 100B. In this way, the exhaust passage 28 formed of the single pipe is partitioned with the partitioning member 29 and the first exhaust passage 28A and the second exhaust passage 28B are formed in the exhaust passage 28 formed of the single pipe. The exhaust gas Ex flows into both of an inlet 28I1 of the first exhaust passage 28A and an inlet 28I2 of the second exhaust passage 28B, flows into the heaters 105 of the respective Stirling engines 100A and 100B, and then flows out of both an outlet 28W1 of the first exhaust passage 28A and an outlet 28W2 of the second exhaust passage 28B.

With this structure, because the exhaust gas Ex is separately introduced into both the first exhaust passage 28A and the second exhaust passage 28B, the exhaust gas Ex supplied to the heater 105 of the upstream Stirling engine 100A and the exhaust gas Ex supplied to the heater 105 of the downstream Stirling engine 100B are substantially the same in temperature. As a result, the power generated by the Stirling engine 100A and the power generated by the Stirling engine 100B are substantially the same and the power difference between them reduces. Therefore, if the power of the Stirling engines 100A and 100B is combined and taken out as in the exhaust heat recovery system 1, a mechanism for absorbing the power difference between the respective Stirling engines 100A and 100B is unnecessary or can be a simple structure.

The partitioning member 29 may be provided between the heater 105 of the Stirling engine 100A disposed on the upstream side and the heater 105 of the Stirling engine 100B disposed on the downstream side. In other words, it is essential only that the partitioning member 29 be disposed between the low temperature side cylinder 102 side of the heater 105 of the Stirling engine 100A disposed on the upstream side and the high temperature side cylinder 101 side of the heater 105 of the Stirling engine 100B disposed on the downstream side (at portions A and B in FIG. 6). However, if the partitioning member 29 is also provided on the side of the heater 105 of the Stirling engine 100A disposed on the upstream side and on the side portion of the heater 105 of the Stirling engine 100B disposed on the downstream side as in the first embodiment, it is possible to more reliably divide the exhaust gas Ex to introduce it into the heaters of the respective Stirling engines 100A and 100B. If the regenerators 106 shown in FIG. 1 are disposed inside the first exhaust passage 28A and the second exhaust passage 28B, it is preferable to provide the partitioning member 29 on the side portion of the regenerators 106 as well.

Especially, in the first embodiment, the second exhaust passage 28B is provided to be adjacent to the heater 105 of the Stirling engine 100A disposed on the upstream side and the first exhaust passage 28A is provided to be adjacent to the heater 105 of the Stirling engine 100B disposed on the downstream side. Therefore, by providing the partitioning member 29 on the side portion of the heaters 105 as well, it is possible to suppress contact between the heaters 105 of the respective Stirling engines 100A and 100B and the exhaust gas Ex flowing through the first exhaust passage 28A or the exhaust gas Ex flowing through the second exhaust passage 28B.

In other words, in the second exhaust passage 28B, contact between the heater 105 of the Stirling engine 100A disposed on the upstream side and the exhaust gas Ex flowing through the second exhaust passage 28B is suppressed and therefore the exhaust gas Ex flows into the heater 105 of the Stirling engine 100B disposed on the downstream side with a minimum temperature reduction. In the first exhaust passage 28A, on the other hand, contact between the lowered temperature exhaust gas Ex after passing through the heater 105 of the Stirling engine 100A disposed on the upstream side and the heater 105 of the Stirling engine 100B disposed on the downstream side is suppressed and therefore it is possible to suppress reduction in temperature of the downstream side heater 105. As a result, it is possible to more reliably suppress the power difference between the Stirling engines 100A and 100B.

A heat insulator 30 may be provided between the heater 105 disposed on the upstream side in the flowing direction of the exhaust gas Ex and the heat medium passage provided with the heater 105 disposed on the downstream side in the flowing direction of the exhaust gas Ex, i.e., the second exhaust passage 28B (the same holds for the following examples). In this way, it is possible to suppress transfer of heat of the exhaust gas Ex flowing through the second exhaust passage 28B to the heater 105 of the upstream side Stirling engine 100A provided to be adjacent to the second exhaust passage 28B. As a result, it is possible to more reliably suppress the reduction in the temperature of the exhaust gas Ex flowing into the heater 105 of the Stirling engine 100E disposed on the downstream side to thereby more reliably reduce the power difference between the Stirling engines 100A and 100B. The heat insulator 30 may be provided on the second exhaust passage 28B side or on the heater 105 side of the Stirling engine 100A disposed on the upstream side. Alternatively, the partitioning member 29 may have a heat insulation structure.

In a portion of the first exhaust passage 28A adjacent to the heater 105 of the Stirling engine 100B disposed on the downstream side, the exhaust gas Ex from which heat energy has been recovered by the heater 105 of the Stirling engine 100A disposed on the upstream side and which has reduced in temperature flows. Therefore, a heat insulator may be also provided between the heater 105 disposed on the downstream side in the flowing direction of the exhaust gas Ex and the heat medium passage provided with the heater 105 disposed on the upstream side of the flowing direction of the exhaust gas Ex, i.e., the first exhaust passage 28A (the same holds for the following examples).

In this way, it is possible to suppress taking of the heat of the exhaust gas Ex flowing into the heater 105 of the Stirling engine 100B disposed on the downstream side by the lowered temperature exhaust gas Ex flowing through the first exhaust passage 28A. As a result, it is possible to suppress a difference in temperature between the respective heaters 105 of the Stirling engines 100A and 100B to thereby more reliably reduce the power difference between the Stirling engines 100A and 100B. This heat insulator may be provided on the first exhaust passage 28A side or on the heater 105 side of the Stirling engine 100B disposed on the downstream side. Alternatively, the partitioning member 29 may have a heat insulation structure.

The partitioning member 29 is a plate-shaped member, for example, which may be mounted inside the exhaust passage 28 or may be mounted on the Stirling engine 100A or 100B. If the partitioning member 29 is mounted inside the exhaust passage, it is welded to an exhaust passage inner wall face facing the heater 105 of the Stirling engine 100A or 100B, for example. If the partitioning member 29 is mounted on the Stirling engine 100A or 100B, the partitioning member 29 is fixed to the heater 105 or the partitioning member 29 is fixed to the base plate 111 shown in FIG. 1, for example.

Although the exhaust heat recovery system 1 has the two Stirling engines 100A and 100B, the number of Stirling engines is not limited to it. The exhaust passage 28 that is the heat medium passage is partitioned into at least the same number of passages as the Stirling engines according to the number of the Stirling engines.

(First Modification)

Figure 8:
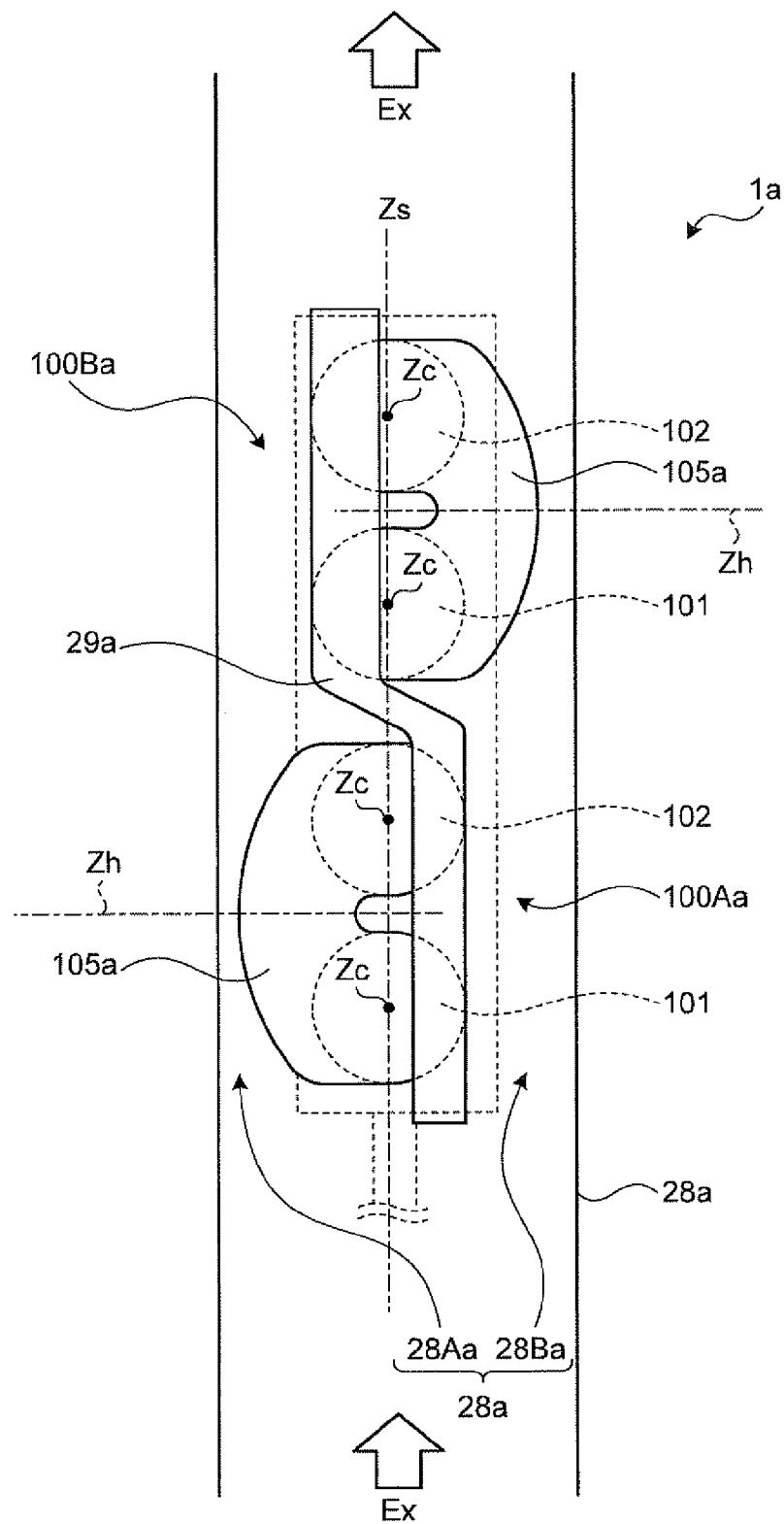
FIG. 8 is a side view illustrating an exhaust heat recovery system according to a first modification of the first embodiment.
Figure 9:
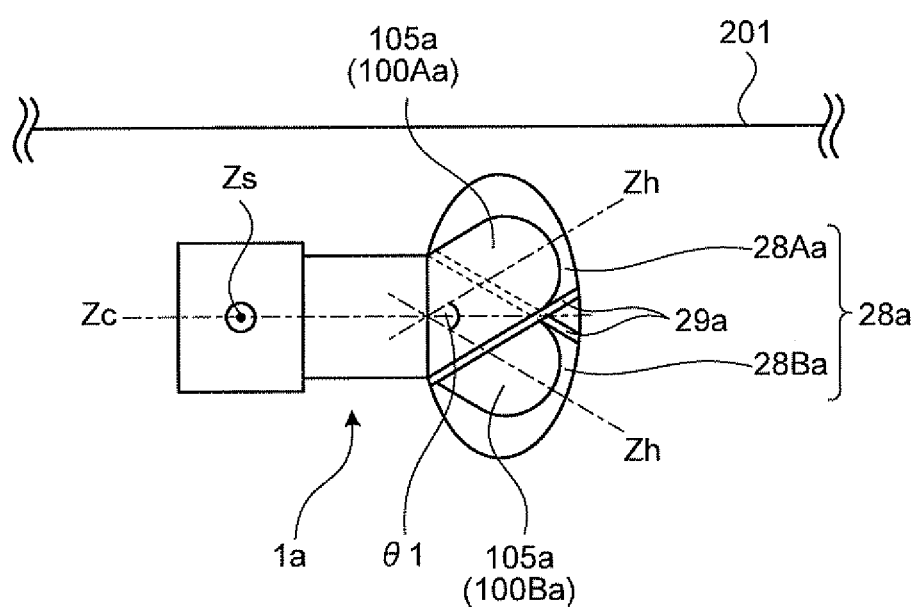
FIG. 9 is a front view illustrating the exhaust heat recovery system according to the first modification of the first embodiment.

FIG. 8 is a side view illustrating an exhaust heat recovery system according to a first modification of the first embodiment. FIG. 9 is a front view illustrating the exhaust heat recovery system according to the first modification of the first embodiment. The first modification has substantially similar structures to those of the first embodiment described above but is different in that respective heaters 105a of Stirling engines 100Aa and 100Ba are inclined. Other structures are similar to those of the first embodiment described above and the structures disclosed in the first embodiment can be applied to the first modification as well.

As shown in FIGS. 8 and 9, in an exhaust heat recovery system 1a, a partitioning member 29a is provided between the heater 105a of the Stirling engine 100Aa disposed on the upstream side and the heater 105a of the Stirling engine 100Ba disposed on the downstream side. In this way, an inside of an exhaust passage 28a formed of a single pipe is partitioned with the partitioning member 29a and a first exhaust passage 28Aa and a second exhaust passage 28Ba are formed in the exhaust passage 28a formed of the single pipe.

As shown in FIG. 9, the upstream Stirling engine 100Aa and the downstream Stirling engine 100Ba constituting the exhaust heat recovery system 1a have the respective heaters 105a inclined in opposite directions with respect to a plane including the cylinder central axes Zc and the exhaust heat recovery engine rotational axes Zs. In other words, central axes Zh of the respective heaters 105a intersect at predetermined angles θ1. The respective heaters 105a of the Stirling engines 100Aa and 100Ba are disposed in the first exhaust passage 28Aa and the second exhaust passage 28Ba, respectively, while inclined with respect to the plane. As a result, the respective heaters 105a of the Stirling engines 100Aa and 100Ba are displaced from each other in opposite directions in a direction orthogonal to the exhaust heat recovery engine rotational axes Zs that are the central axes of the output shafts. The high temperature side cylinders 101 and the low temperature side cylinders 102 of the Stirling engines 100Aa and 100Ba are arranged in a line so that all the cylinder central axes Zc are parallel.

As described above, if the heaters of the Stirling engines 100Aa and 100Ba are inclined, an overlap between the upstream heater 105a and the downstream heater 105a becomes smaller than that between the heaters 105a that are not inclined when the Stirling engines 100Aa and 100Ba are seen in the direction of the exhaust heat recovery engine rotational axes Zs. In this way, it is possible to reduce bend portions of the first exhaust passage 28Aa and the second exhaust passage 28Ba as compared with the case where the respective heaters 105a of the Stirling engines 100Aa and 100Ba are not inclined. As a result, it is possible to reduce resistance to the flows of the exhaust gas and therefore it is possible to suppress reduction in exhaust efficiency of the thermal engine for which the exhaust heat recovery is intended, i.e., the internal-combustion engine 71 shown in FIG. 3-1 in the first modification, in addition to the operation and effects of the first embodiment described above. Moreover, it is possible to simplify a shape of the partitioning member 29a in the exhaust heat recovery system 1a as compared with the case where the heaters 105a are not inclined, which facilitates manufacturing, maintenance, and inspection of the exhaust heat recovery system 1a.

(Second Modification)

Figure 10:
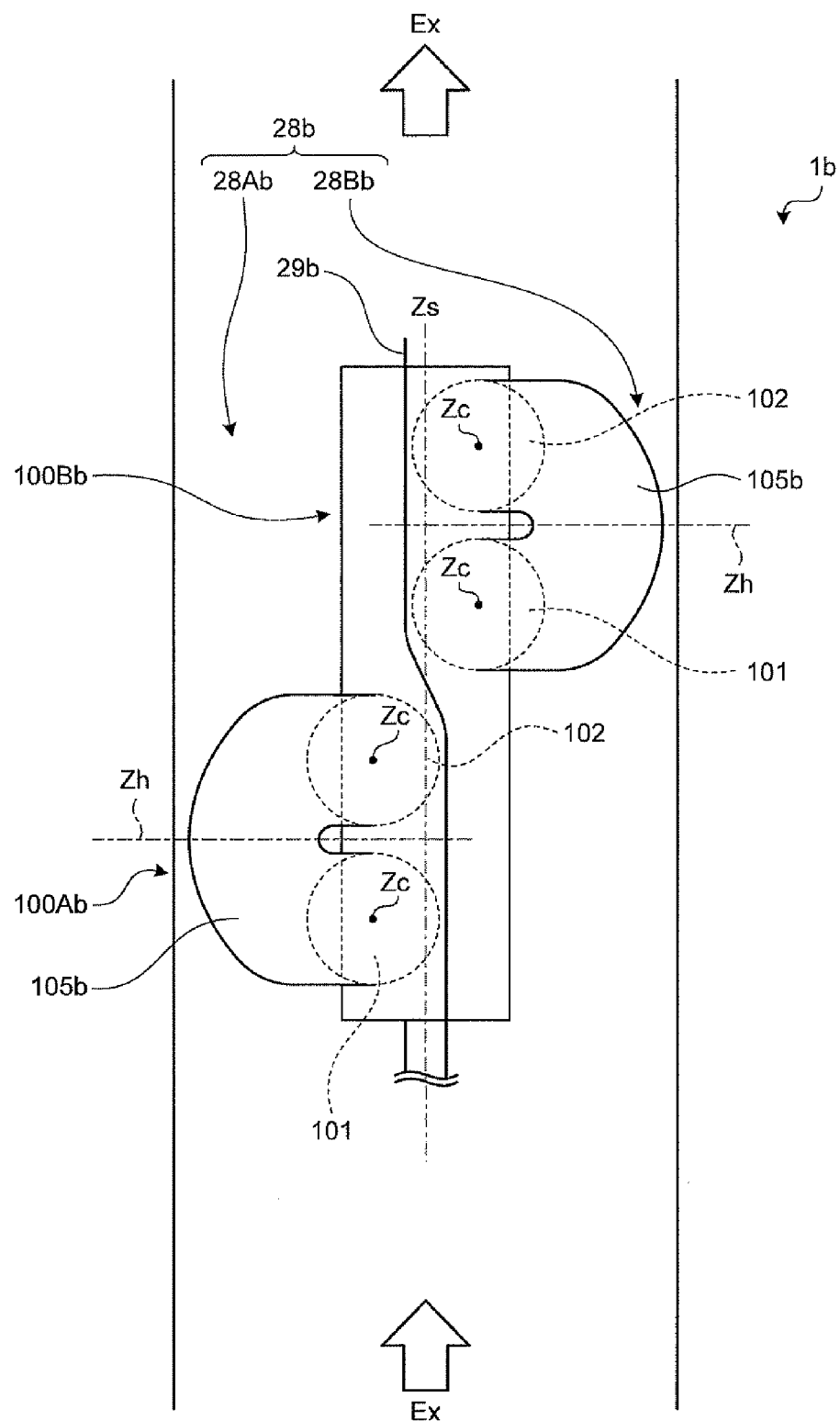
FIG. 10 is a side view illustrating an exhaust heat recovery system according to a second modification of the first embodiment.
Figure 11:
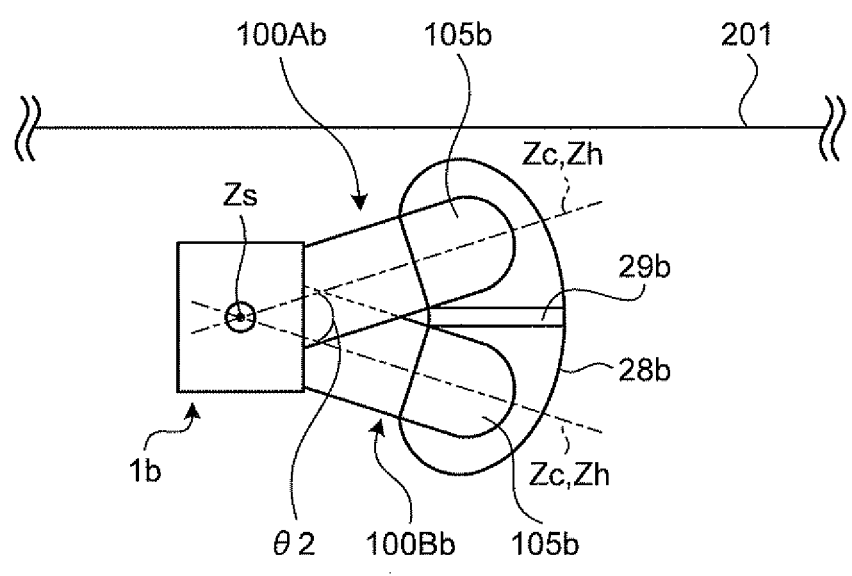
FIG. 11 is a front view illustrating the exhaust heat recovery system according to the second modification of the first embodiment.

FIG. 10 is a side view illustrating an exhaust heat recovery system according to a second modification of the first embodiment. FIG. 11 is a front view illustrating the exhaust heat recovery system according to the second modification of the first embodiment. The second modification is substantially similar to the above-described first modification of the first embodiment but is different in that heaters 105b of Stirling engines 100Ab and 100Bb are inclined by inclining the high temperature side cylinder 101 and the low temperature side cylinder 102 of the Stirling engine 100Ab and the high temperature side cylinder 101 and the low temperature side cylinder 102 of the Stirling engine 100Bb. Other structures are similar to those of the above-described first modification of the first embodiment and the structures disclosed in the first modification of the first embodiment can be applied to the second modification as well.

As shown in FIGS. 10 and 11, in an exhaust heat recovery system 1b, a partitioning member 29b is provided between the heater 105b of the Stirling engine 100Ab disposed on the upstream side and the heater 105b of the Stirling engine 100Bb disposed on the downstream side. In this way, an inside of an exhaust passage 28b formed of a single pipe is partitioned with the partitioning member 29b and a first exhaust passage 28Ab and a second exhaust passage 288Bb are formed in the exhaust passage 28b formed of the single pipe.

As shown in FIG. 11, cylinder central axes Zc of the high temperature side cylinder 101 and the low temperature side cylinder 102 constituting the upstream Stirling engine 100Ab and cylinder central axes Zc of the high temperature side cylinder 101 and the low temperature side cylinder 102 constituting the downstream Stirling engine 100Bb are inclined in opposite directions about exhaust heat recovery engine rotational axes Zs. In each of the Stirling engines 100Ab and 100Bb, a central axis Zh of the heater 105b and the cylinder central axes Zc are parallel. Therefore, with the above structure, the respective heaters 105b are inclined in different directions about the exhaust heat recovery engine rotational axes Zs and the central axes Zh of the respective heaters 105b intersect at predetermined angles θ2. As a result, the respective heaters 105b of the Stirling engines 100Ab and 100Bb are displaced from each other in opposite directions in a direction orthogonal to the exhaust heat recovery engine rotational axes Zs that are the central axes of the output shafts.

With this structure, it is possible to reduce bend portions of the first exhaust passage 28Ab and the second exhaust passage 28Bb as compared with the case where the respective heaters 105a of the Stirling engines 100Ab and 100Bb are not inclined. As result, the second modification can exert similar operation and effects to those of the above-described first modification of the first embodiment.

Each of the first embodiment and its modifications includes the plurality of exhaust heat recovery engines for recovering the heat energy of the heat medium exhausted from an exhaust heat recovery target and at least the same number of heat medium passages provided at least the same number of the exhaust heat recovery engines for causing the heat medium pass through. The heaters provided to the respective exhaust heat recovery engines are disposed in the respective heat medium passages and the respective heaters are oriented from the upstream side toward the downstream side in the flowing direction of heat medium. In this way, the heat media is separately supplied to the heaters provided to the respective exhaust heat recovery engines and therefore it is possible to reduce the difference in temperature between the heat media supplied to the respective heaters. As a result, the respective exhaust heat recovery engines generate substantially the same degrees of power and therefore it is possible to reduce the difference in generated power between the respective exhaust heat recovery engines when the plurality of exhaust heat recovery engines are used to recover the exhaust heat.

Second Embodiment

A second embodiment has substantially similar structures to those of the first embodiment but is different in that a heat medium passage provided with a heater of an exhaust heat recovery engine disposed on an upstream side in a flowing direction of a heat medium and a heat medium passage provided with a heater of an exhaust heat recovery engine disposed on a downstream side in the flowing direction of the heat medium are formed of different pipes independent of each other. Other structures are similar to those of the first embodiment.

Figure 12:
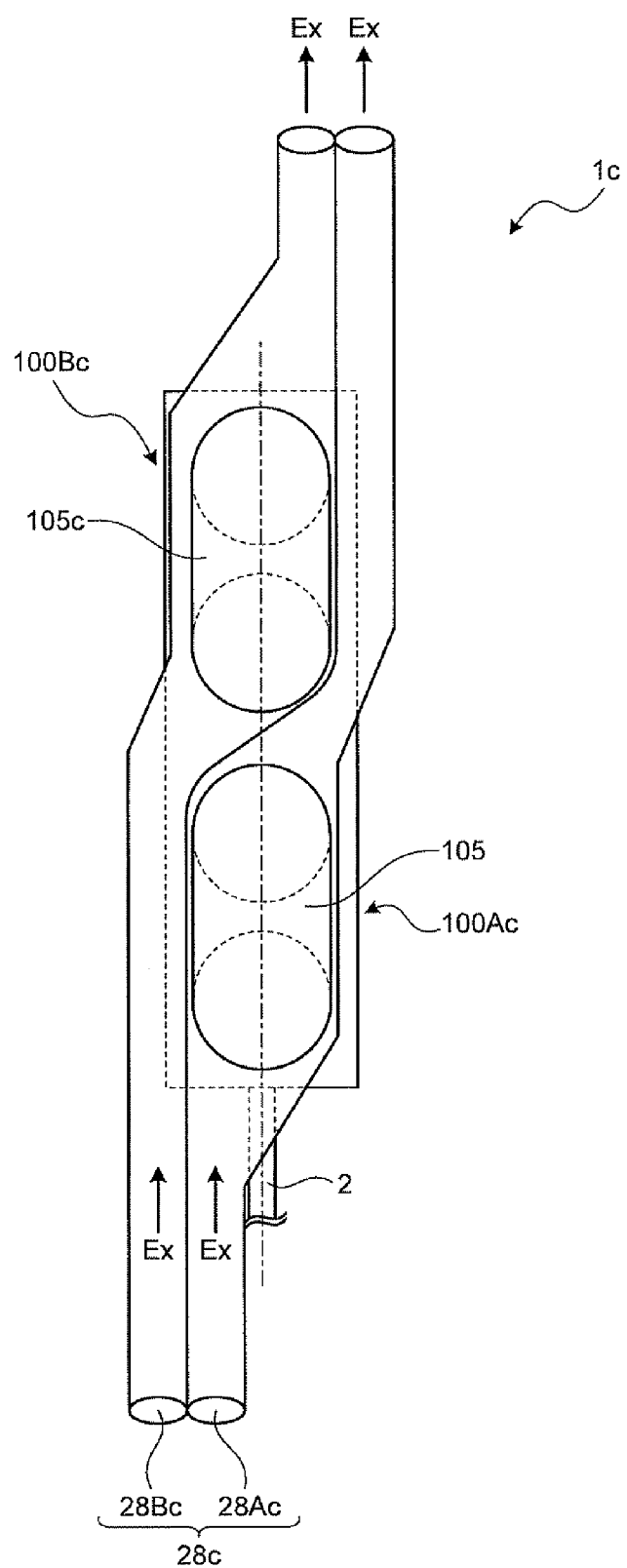
FIG. 12 is a side view illustrating an exhaust heat recovery system according to a second embodiment.
Figure 13:
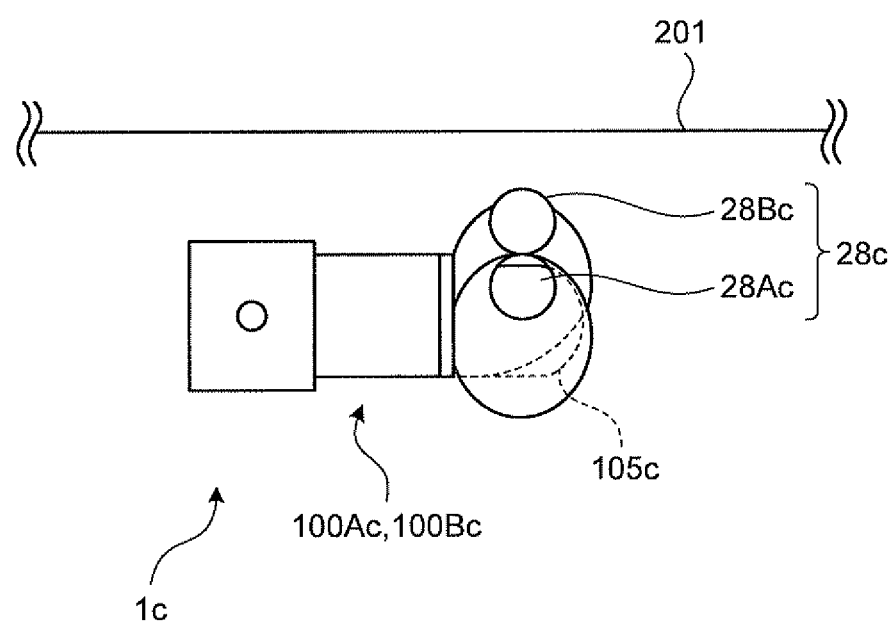
FIG. 13 is a front view illustrating the exhaust heat recovery system according to the second embodiment.

FIG. 12 is a plan view illustrating an exhaust heat recovery system according to a second embodiment. FIG. 13 is a front view illustrating the exhaust heat recovery system according to the second embodiment. Because a layout of a plurality of Stirling engines 100Ac and 100Bc constituting an exhaust heat recovery system 1c and a layout of their cylinders are similar to those of the first embodiment described above, description of them will be omitted.

Exhaust passages 28c that are the heat medium passages for supplying exhaust gas Ex of the internal-combustion engine 71 shown in FIG. 3-1 to heaters 105c of the Stirling engines 100Ac and 100Bc constituting the exhaust heat recovery system 1c are formed of the different two pipes. In other words, the exhaust passages 28c are formed of a first exhaust passage 28Ac in which the heater 105c of the Stirling engine 100Ac disposed on the upstream side is disposed and a second exhaust passage 28Bc in which the heater 105c of the Stirling engine 100Bc disposed on the downstream side is disposed.

The respective heaters 105c of the Stirling engines 100Ac and 100Bc are provided in the first exhaust passage 28Ac and the second exhaust passage 28Bc formed of the different pipes. In this way, the exhaust gas Ex is separately introduced into both of the first exhaust passage 28Ac and the second exhaust passage 28Bc and therefore the exhaust gas Ex supplied to the heater 105a of the upstream Stirling engine 100Ac and the exhaust gas Ex supplied to the heater 105a of the downstream Stirling engine 100Bc become substantially the same in temperature. As a result, degrees of power generated by the Stirling engine 100Ac and power generated by the Stirling engine 100Bc become substantially the same and a difference in power between them reduces.

In the exhaust heat recovery system 1c, the first exhaust passage 28Ac and the second exhaust passage 28Bc separate from each other house the heaters 105c of the Stirling engines 100Ac and 100Bc, respectively. In this way, it is possible to completely avoid interference between the exhaust gas Ex in the first exhaust passage 28Ac and the exhaust gas Ex in the second exhaust passage 28Bc an therefore it is relatively easy to control temperatures of the exhaust gas Ex supplied to the respective heaters 105c of the Stirling engines 100Ac and 100Bc. Moreover, the partitioning member for partitioning the inside of the single exhaust passage becomes unnecessary, which makes it relatively easy to form the exhaust heat recovery system 1c.

(First Modification)

Figure 14:
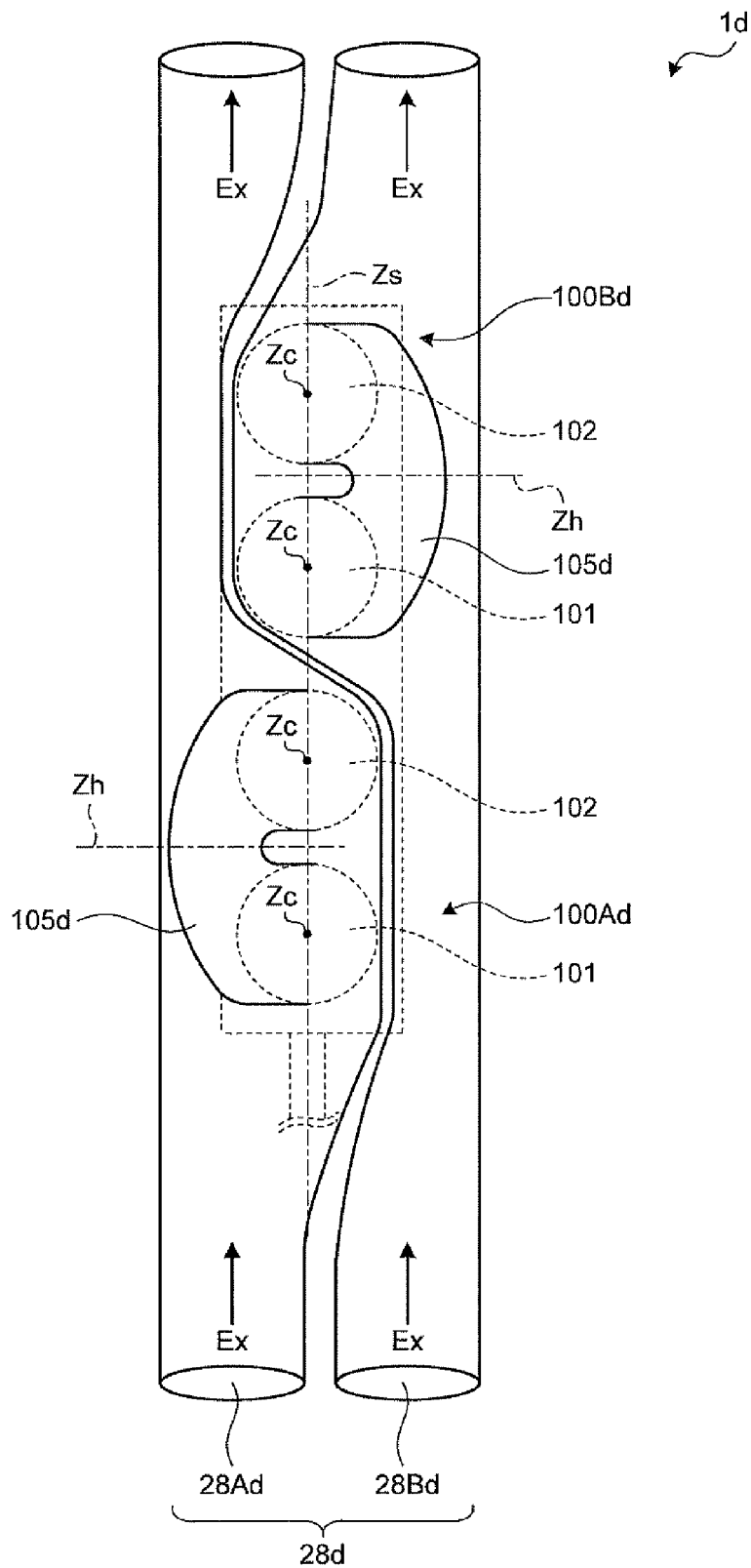
FIG. 14 is a side view illustrating an exhaust heat recovery system according to a first modification of the second embodiment.
Figure 15:
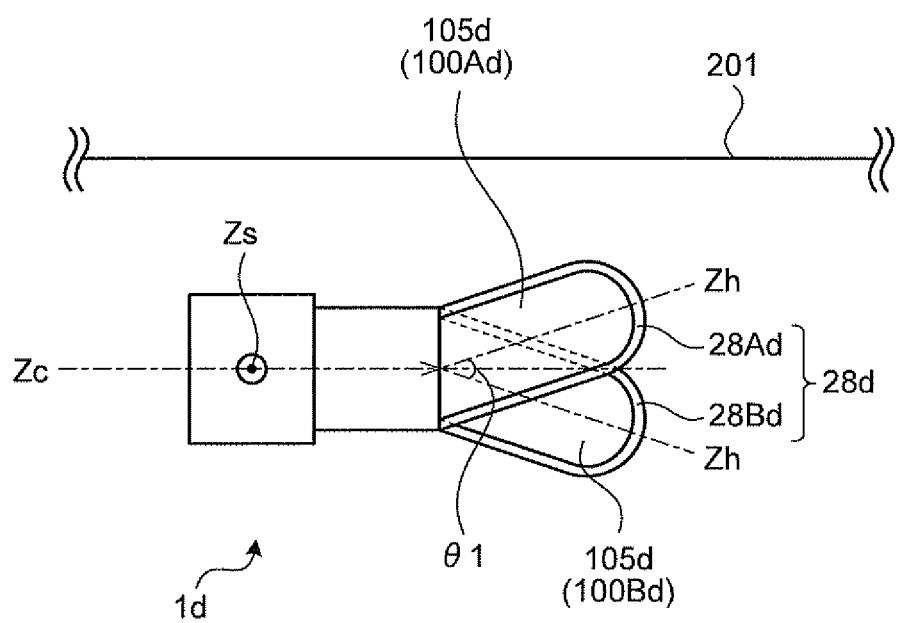
FIG. 15 is a front view illustrating the exhaust heat recovery system according to the first modification of the second embodiment.

FIG. 14 is a side view illustrating an exhaust heat recovery system according to a first modification of the second embodiment. FIG. 15 is a front view illustrating the exhaust heat recovery system according to the first modification of the second embodiment. The first modification has substantially similar structures to those of the second embodiment described above but is different in that respective heaters 105d of Stirling engines 100Ad and 100Bd are inclined. Other structures are similar to those of the second embodiment described above and the structures disclosed in the second embodiment can be applied to the first modification as well.

As shown in FIG. 15, the upstream Stirling engine 100Ad and the downstream Stirling engine 100Bd constituting an exhaust heat recovery system 1d have the respective heaters 105d inclined in different directions with respect to a plane including cylinder central axes Zc and the exhaust heat recovery engine rotational axes Zs. In other words, central axes Zh of the respective heaters 105d intersect at predetermined angles θ1. The respective heaters 105d of the Stirling engines 100Ad and 100Bd are disposed in a first exhaust passage 28Ad and a second exhaust passage 28Bd, respectively, while inclined with respect to the plane. As a result, the respective heaters 105d of the Stirling engines 100Ad and 100Bd are displaced from each other in opposite directions in a direction orthogonal to the exhaust heat recovery engine rotational axes Zs that are the central axes of the output shafts. The high temperature side cylinders 101 and the low temperature side cylinders 102 of the Stirling engines 100Ad and 100Bd are arranged in a line so that all the cylinder central axes Zc are parallel.

As shown in FIGS. 14 and 15, in the exhaust heat recovery system 1d, an exhaust passages 28d for supplying the exhaust gas Ex to the Stirling engines 100Ad and 100Bd are formed of the different pipes. In other words, the exhaust passages 28d are formed of the first exhaust passage 28Ad and the second exhaust passage 28Bd. The heater 105d of the Stirling engine 100Ad disposed on the upstream side is housed in the first exhaust passage 28Ad and the heater 105d of the Stirling engine 100Bd disposed on the downstream side is housed in the second exhaust passage 28Bd.

Because the heaters 105d of the Stirling engines 100Ad and 100Bd are inclined in the exhaust heat recovery system 1d, it is possible to reduce bend portions of the first exhaust passage 28Ad and the second exhaust passage 28Bd as compared with the case where the respective heaters 105d are not inclined. As a result, it is possible to reduce resistance to the flows of the exhaust gas Ex and therefore it is possible to suppress reduction in exhaust efficiency of the thermal engine for which the exhaust heat recovery is intended, i.e., the internal-combustion engine 71 shown in FIG. 3-1 in the first modification, in addition to the operation and effects of the second embodiment.

(Second Modification)

Figure 16:
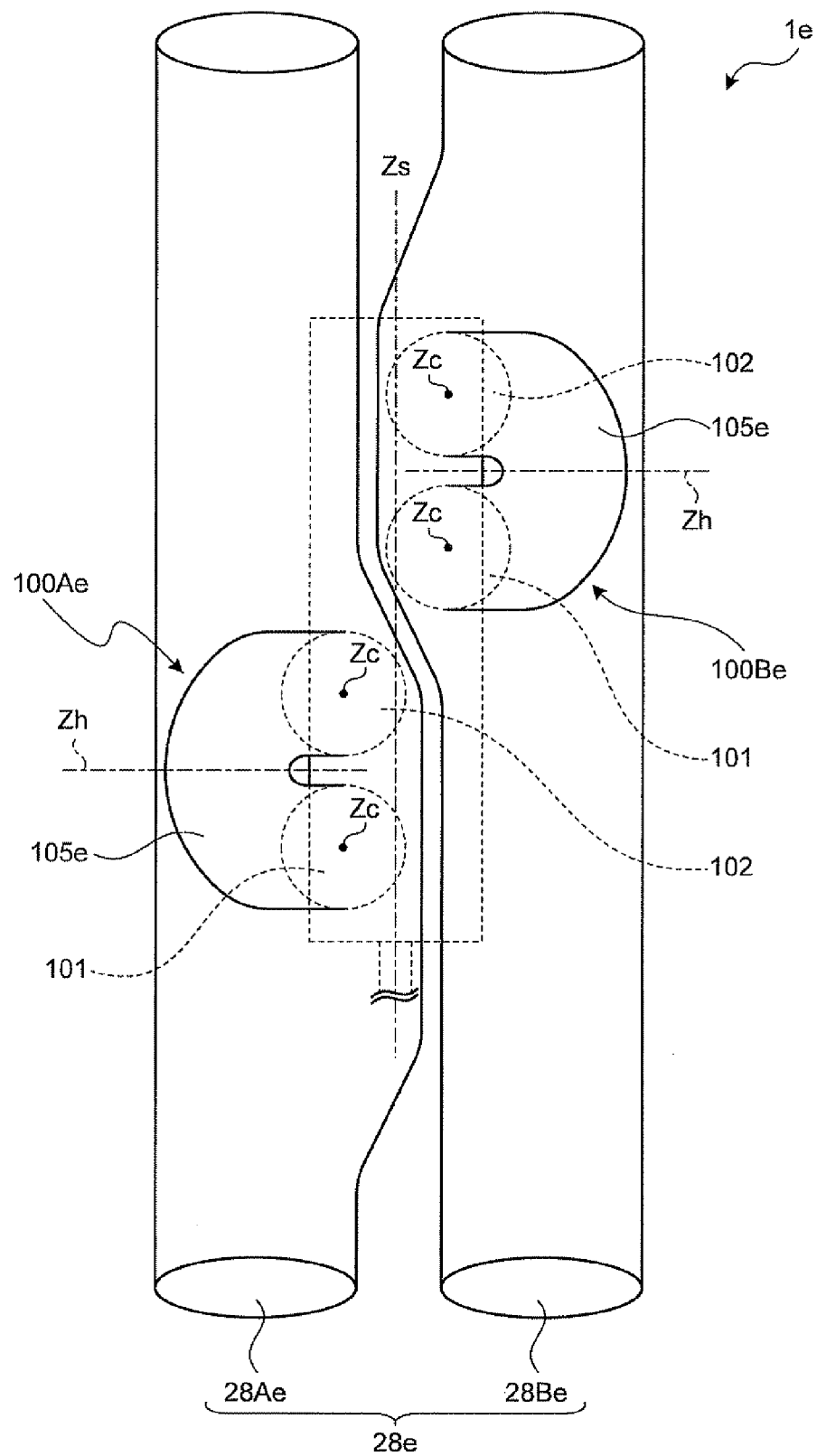
FIG. 16 is a side view illustrating an exhaust heat recovery system according to a second modification of the second embodiment.
Figure 17:
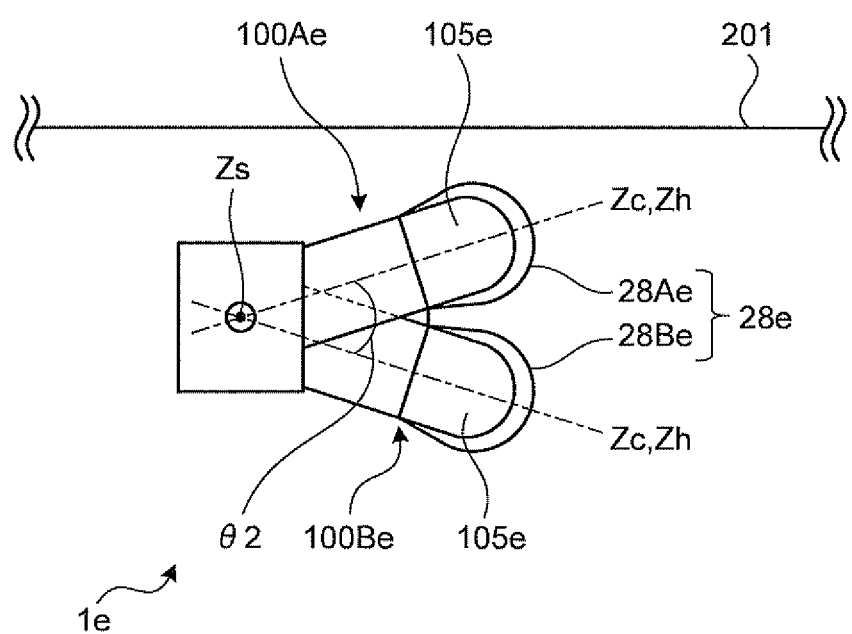
FIG. 17 is a front view illustrating the exhaust heat recovery system according to the second modification of the second embodiment.

FIG. 16 is a side view illustrating an exhaust heat recovery system according to a second modification of the second embodiment. FIG. 17 is a front view illustrating the exhaust heat recovery system according to the second modification of the second embodiment. The second modification is substantially similar to the above-described first modification of the second embodiment but is different in that heaters 105e of Stirling engines 100Ae and 100Be are inclined by inclining the high temperature side cylinder 101 and the low temperature side cylinder 102 of the Stirling engine 100Ae and the high temperature side cylinder 101 and the low temperature side cylinder 102 of the Stirling engine 100Be. Other structures are similar to those of the above-described first modification of the second embodiment and the structures disclosed in the first modification of the second embodiment can be applied to the second modification as well.

As shown in FIG. 17, cylinder central axes Zc of the high temperature side cylinder 101 and the low temperature side cylinder 102 constituting the upstream Stirling engine 100Ae and cylinder central axes Zc of the high temperature side cylinder 101 and the low temperature side cylinder 102 constituting the downstream Stirling engine 100Be are inclined in different directions about exhaust heat recovery engine rotational axes Zs. In each of the Stirling engines 100Ae and 100Be, a central axis Zh of the heater 105e and the cylinder central axes Zc are parallel. Therefore, with the above structure, the respective heaters 105e are inclined in different directions about the exhaust heat recovery engine rotational axes Zs and the central axes Zh of the respective heaters 105e intersect at predetermined angles θ2. As a result, the respective heaters 105e of the Stirling engines 100Ae and 100Be are displaced from each other in opposite directions in a direction orthogonal to the exhaust heat recovery engine rotational axes Zs that are the central axes of the output shafts.

As shown in FIGS. 16 and 17, in an exhaust heat recovery system 1e, an exhaust passages 28e for supplying the exhaust gas Ex to the Stirling engines 100Ae and 100Be are formed of the different pipes. In other words, the exhaust passages 28e are formed of a first exhaust passage 28Ae and a second exhaust passage 28Be. The heater 105e of the Stirling engine 100Ae disposed on the upstream side is housed in the first exhaust passage 28Ae and the heater 105e of the Stirling engine 100Be disposed on the downstream side is housed in the second exhaust passage 28Be.

With this structure, it is possible to reduce bend portions of the first exhaust passage 28Ae and the second exhaust passage 28Be as compared with the case where the respective heaters 105e of the Stirling engines 100Ae and 100Be are not inclined. As a result, the second modification can exert similar operation and effects to those of the above-described first modification of the second embodiment.

The second embodiment and its modifications include the structures similar to those of the first embodiment and its modifications and therefore exert similar operation and effects to those of the first embodiment and its modifications. In the second embodiment and its modifications, the heat medium passages for supplying the heat media to the exhaust heat recovery engines are formed of the separate pipes. In this way, it is possible to completely avoid interference between the heat media flowing through the respective heat medium passages and therefore it is relatively easy to control temperatures of the heat media supplied to the respective heaters of the exhaust heat recovery engines.

Industrial Applicability

As described above, the exhaust heat recovery system according to the present invention is useful in recovering the exhaust heat by using the exhaust heat recovery engines and is suitable for reducing a difference in generated power between the respective exhaust heat recovery engines.

Explanations of Letters or Numerals 1, 1a, 1b, 1c, 1d, 1e exhaust heat recovery system
2 driven shaft
8 connecting shaft
28, 28A, 28B, 28a, 28Aa, 28Ba, 28b, 28Ab, 28Bb, 28c, 28Ac, 28Bc, 28d, 28Ad, 28Bd, 28e, 28Ae, 28Be exhaust passage
29, 29a, 29b partitioning member
30 heat insulator
71 internal-combustion engine
100, 100A, 100B, 100Aa, 100Ba, 100Ab, 100Bb, 100Ac, 100Bc, 100Ad, 100Bd, 100Ae, 100Be Stirling engine
101 high temperature side cylinder
102 low temperature side cylinder
103 high temperature side piston
104 low temperature side piston
105, 105a, 105b, 105c, 105d, 105e heater
106 regenerator
107 cooler
108 heat exchanger
110 crankshaft
114 casing
114A crankcase
114B cylinder block
200 vehicle
201 floor

The invention claimed is:

1. An exhaust heat recovery system comprising:
a plurality of exhaust heat recovery engines each of which includes a heater for giving heat energy of a heat medium exhausted from an exhaust heat recovery target to working fluid, and generates power by heat energy of the heat medium; and
a plurality of heat medium passages that are provided at at least a same number of the exhaust heat recovery engines and cause the heat medium to pass through, wherein
at least one of the heaters provided to each of the exhaust heat recovery engines is disposed in each of the plurality of heat medium passages, respectively, and the respective heaters are oriented from an upstream side toward a downstream side in a flowing direction of the heat medium through the heat medium passages, with one heater being positioned further upstream than another heater, and
each of the plurality of heat medium passages forms a separate flow path for the respective heaters.

2. An exhaust heat recovery system comprising:
a plurality of exhaust heat recovery engines each of which includes a heater for giving heat energy of a heat medium exhausted from an exhaust heat recovery target to working fluid, and generates power by heat energy of the heat medium; and
a plurality of heat medium passages that are provided at at least a same number of the exhaust heat recovery engines and cause the heat medium to pass through, wherein at least one of the heaters provided to each of the exhaust heat recovery engines is disposed in each of the plurality of heat medium passages, respectively, and the respective heaters are oriented from an upstream side toward a downstream side in a flowing direction of the heat medium through the heat medium passages, with one heater being positioned further upstream than another heater, and each of the plurality of heat medium passages forms a separate flow path for the respective heaters, each of the plurality of heat medium passages are formed by partitioning a single pipe with a partitioning member provided between the heaters provided to the respective exhaust heat recovery engines.

3. The exhaust heat recovery system according to claim 2, wherein a heat insulator is provided between the one heater positioned further upstream and the heat medium passage provided with the other heater.

4. An exhaust heat recovery system comprising:

a plurality of exhaust heat recovery engines each of which includes a heater for giving heat energy of a heat medium exhausted from an exhaust heat recovery target to working fluid, and generates power by heat energy of the heat medium; and a plurality of heat medium passages that are provided at at least a same number of the exhaust heat recovery engines and cause the heat medium to pass through, wherein at least one of the heaters provided to each of the exhaust heat recovery engines is disposed in each of the plurality of heat medium passages, respectively, and the respective heaters are oriented from an upstream side toward a downstream side in a flowing direction of the heat medium through the heat medium passages, with one heater being positioned further upstream than another heater, and each of the plurality of heat medium passages forms a separate flow path for the respective heaters, and each of the plurality of heat medium passages are formed of different pipes independent of each other.

5. The exhaust heat recovery system according to claim 1, wherein the respective heaters are displaced from each other in opposite directions in a direction orthogonal to central axes of output shafts of the exhaust heat recovery engines.

6. The exhaust heat recovery system according to claim 1, wherein the respective output shafts of the plurality of exhaust heat recovery engines are connected to each other.

7. The exhaust heat recovery system according to claim 2, wherein the respective heaters are displaced from each other in opposite directions in a direction orthogonal to central axes of output shafts of the exhaust heat recovery engines.

8. The exhaust heat recovery system according to claim 3, wherein the respective heaters are displaced from each other in opposite directions in a direction orthogonal to central axes of output shafts of the exhaust heat recovery engines.

9. The exhaust heat recovery system according to claim 4, wherein the respective heaters are displaced from each other in opposite directions in a direction orthogonal to central axes of output shafts of the exhaust heat recovery engines.

10. The exhaust heat recovery system according to claim 2, wherein the respective output shafts of the plurality of exhaust heat recovery engines are connected to each other.

11. The exhaust heat recovery system according to claim 3, wherein the respective output shafts of the plurality of exhaust heat recovery engines are connected to each other.

12. The exhaust heat recovery system according to claim 4, wherein the respective output shafts of the plurality of exhaust heat recovery engines are connected to each other.

13. The exhaust heat recovery system according to claim 5, wherein the respective output shafts of the plurality of exhaust heat recovery engines are connected to each other.

* * * * *